United States Patent
Takei

(10) Patent No.: US 10,305,200 B2
(45) Date of Patent: May 28, 2019

(54) WIRELESS COMMUNICATION SYSTEM HAVING A TRANSMISSION UNIT THAT TRANSMITS OR RECEIVES BASED ON A DETECTED TIMING

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 15/208,660

(22) Filed: Jul. 13, 2016

(65) Prior Publication Data

US 2017/0062951 A1    Mar. 2, 2017

(30) Foreign Application Priority Data

Aug. 25, 2015 (JP) ................. 2015-166063

(51) Int. Cl.
*H01Q 21/24* (2006.01)
*H04L 27/26* (2006.01)
*G08C 17/02* (2006.01)

(52) U.S. Cl.
CPC ........... *H01Q 21/245* (2013.01); *G08C 17/02* (2013.01); *H04L 27/2607* (2013.01)

(58) Field of Classification Search
None
See application file for complete search history.

(56) References Cited

U.S. PATENT DOCUMENTS

| | | | | |
|---|---|---|---|---|
| 5,592,177 A | * | 1/1997 | Barrett | H01Q 21/245 342/361 |
| 8,331,793 B2 | * | 12/2012 | Takeuchi | H04J 3/1652 398/140 |
| 8,594,733 B2 | * | 11/2013 | Laroia | H04W 16/12 455/444 |

FOREIGN PATENT DOCUMENTS

JP    2015-39218 A    2/2015

* cited by examiner

*Primary Examiner* — Daniell L Negron
(74) *Attorney, Agent, or Firm* — Crowell & Moring LLP

(57) ABSTRACT

A wireless communication system includes a plurality of wireless devices that communicate with each other. Each of the wireless devices includes a transmission unit configured to transmit a carrier of a fixed strength with polarization waves thereof rotated to a different one of the wireless devices using two antennae spatially orthogonal to each other, a reception unit configured to receive a carrier transmitted from the transmission unit of the different wireless device, and a timing detection unit configured to detect a timing at which the polarization waves of the carrier received by the reception unit within a period of rotation indicates a maximum strength. The transmission unit performs transmission or reception of a specific information signal using the carrier based on the timing detected by the timing detection unit.

10 Claims, 14 Drawing Sheets

WIRELESS COMMUNICATION SYSTEM HAVING A TRANSMISSION UNIT THAT TRANSMITS OR RECEIVES BASED ON A DETECTED TIMING

BACKGROUND OF THE INVENTION

1. Field of the Invention

The present invention relates to a wireless communication system that transmits and receives information using polarization waves whose polarization angle varies.

2. Description of the Related Art

Toward the realization of sustainable development of society, high-efficiency operation of social infrastructure systems for producing and distributing, for example, energy, water, gas, petroleum and so forth is important. To this end, high-frequency operation of apparatus configuring the systems is required. In order to implement high-efficiency operation of apparatus configuring a system, a technology is considered promising that collects and analyzes a great amount of data obtained from a large number of sensors disposed in the individual apparatus configuring the system to estimate and predict an operational status and control information obtained on the basis of a result of the estimation is transmitted to the individual apparatus. Thus, a monitoring and controlling network for the technology is required.

In the monitoring and controlling network, a very great number of transmission paths are required for collecting data from the large number of sensors and transmitting control information to the individual apparatus. Therefore, a network configuration which uses a wireless communication technology suitable for a network having a great number of transmission paths is demanded.

Sensors disposed in an apparatus configuring a social infrastructure system and actuators for controlling the apparatus act themselves as electromagnetic wave scattering bodies. Therefore, in a wireless network that uses electromagnetic waves as a communication medium, it cannot be expected for a wireless device configuring the network to communicate in a line-of-sight state, and the network is operated in a special state in which it uses a non-line-of-sight wave for which a multiple reflection wave after reflection by the apparatus is used. As one of technologies for use in such a situation as just described, for example, a technology for implementing wireless communication of high reliability by a transmission antenna and a reception antenna of a small size under an environment in which interference by multi-path waves occurs is disclosed, for example, in JP-2015-039218-A. The technology relates to a polarization angle division diversity wireless transmitter that includes modulation means for modulating an information signal of a first frequency with a second frequency and outputting a resulting first modulation signal, and electromagnetic wave transmission means for transmitting the first modulation signal in the form of two polarization waves independent of each other and superimposing a third frequency to the polarization waves.

SUMMARY OF THE INVENTION

Since a social infrastructure system plays an important role to provide a lifeline to the society, it is necessary to strictly restrict intervention in the system by an outsider, and the security in operation of the network is very important. Generally, in wireless communication, a transmission path is an open space, and therefore, it is very difficult to specify a specific transmission path in comparison with wire communication. However, in the proximity of the system, even an outsider can easily acquire energy of wireless communication. Therefore, the possibility of discovery of or intervention in the transmission path by an outsider cannot be denied, and this is a technical subject to be solved from the point of view of the security.

It is an object of the present invention to provide a wireless communication system that can conceal transmission information by wireless communication against an outsider.

To attain the object described above, according to the present invention, there is provided a wireless communication system including a plurality of wireless devices configured to communicate with each other, each of the wireless devices including a transmission unit configured to transmit a carrier of a fixed strength with polarization waves thereof rotated to a different one of the wireless devices using two antennae spatially orthogonal to each other, a reception unit configured to receive a carrier transmitted from the transmission unit of the different wireless device, and a timing detection unit configured to detect a timing at which the polarization waves of the carrier received by the reception unit within a period of rotation indicates a maximum strength, the transmission unit performing transmission or reception of a specific information signal using the carrier based on the timing detected by the timing detection unit.

With the wireless communication system, transmission information by wireless communication can be concealed against an outsider, and high efficiency operation of a social infrastructure system can be implemented with high security.

DESCRIPTION OF THE PREFERRED EMBODIMENTS

In the following, embodiments of the present invention are described in detail with reference to FIGS. 1 to 14.
First Embodiment
A first embodiment of the present invention is described in detail with reference to FIGS. 1 and 14.

Figure 1:
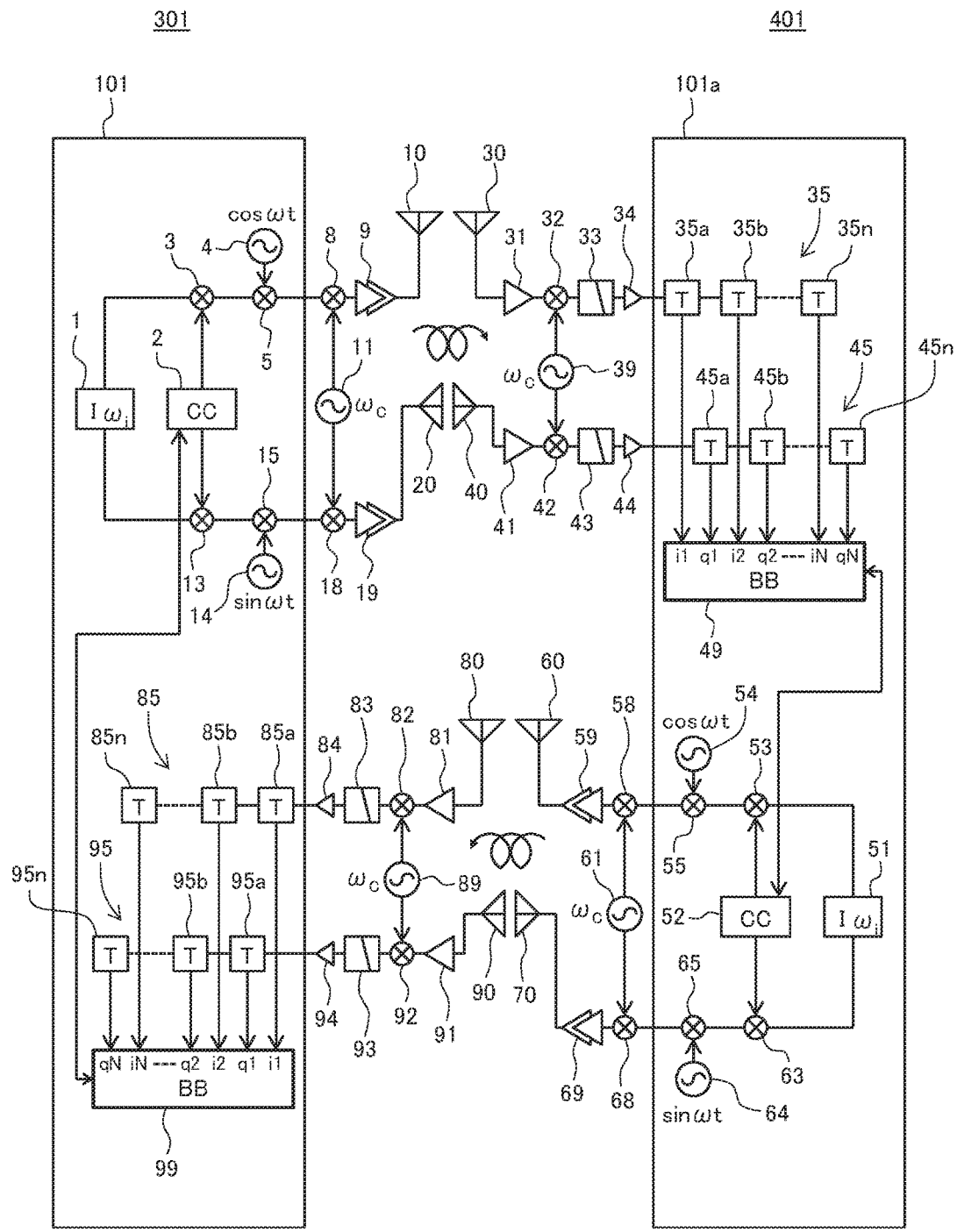
FIG. 1 is a block diagram schematically depicting a wireless communication system according to a first embodiment.

FIG. 1 is a block diagram schematically depicting a wireless communication system according to the first embodiment.

FIG. 1 exemplifies a set of wireless devices extracted from a plurality of wireless devices which configure the wireless communication system, namely, exemplifies rotational polarization wireless devices 301 and 401. Referring to FIG. 1, the rotational polarization wireless device 301 generally includes a transmission system (transmission unit), a reception system (reception unit) and a signal processing system. The transmission system is configured from an information signal generator 1, a cyclic code generation circuit 2, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99.

The information signal generator 1 generates an information signal (specific information signal for being transmitted to the other rotational polarization wireless device 401, and branches the generated information signal into two branched signals. The cyclic code generation circuit 2 generates a cyclic code on the basis of a control signal from the digital signal processing circuit 99 and superimposes the generated cyclic code to one of the information signals outputted as two branch signals from the information signal generator 1 through the multiplier 3 and to the other of the information signals through the multiplier 13. The cosine rotation frequency generation circuit 4 and the sine rotation frequency generation circuit 14 generate signals having a relationship of a cosine wave and a sine wave, respectively. The cosine rotation frequency generation circuit 4 superimposes the generated signal to one of the information signals outputted as two branch signals from the information signal generator 1 by the multiplier 5, and the sine rotation frequency generation circuit 14 multiplies the generated signal to the other of the information signals outputted as two branch signals from the information signal generator 1 by the multiplier 15. The carrier frequency generation circuit 11 generates a carrier signal to be used for transmission of an information signal to the rotational polarization wireless device 401 and multiplies the generated carrier signal to the information signals outputted as two branch signals from the information signal generator 1 through the multipliers 8 and 18. The power amplifiers 9 and 19 amplify the information signals outputted as two branch signals from the information signal generator 1 and send the amplified information signals to the transmission antennae 10 and 20, respectively. The two transmission antennae 10 and 20 are disposed so as to be spatially orthogonal to each other, and the information signals sent through the power amplifiers 9 and 19 (carrier signals to which the information signals are superimposed) are radiated as electromagnetic waves (radio waves) into the space from the transmission antennae 10 and 20.

The two reception antennae 80 and 90 are disposed so as to be spatially orthogonal to each other and simultaneously receive electromagnetic waves (reception electric fields) radiated from the other rotational polarization wireless device 401. The electromagnetic waves received by the reception antennae 80 and 90 (information signals superimposed to the carrier signal) are amplified by the low noise amplifiers 81 and 91, respectively. The local oscillation circuit 89 generates a signal of a frequency same as that of the carrier signal, multiplies the generated signal to the information signals amplified by the low noise amplifiers 81 and 91 through the multipliers 82 and 92 and then send resulting signals to the band-pass filters 83 and 93, respectively. The information signals having passed the band-pass filters 83 and 93 are amplified by the buffer amplifiers 84 and 94 and sent to the delay devices 85 and 95, respectively. The delay devices 85 and 95 are each configured from a plurality of (for example, n) delay devices 85a, 85b, . . . , 85n, or 95a, 95b, . . . , 95n connected in cascade. The inputted information signals are successively delayed by the delay devices 85a, 85b, . . . , 85n, and 95a, 95b, . . . , 95n and inputted to the digital signal processing circuit 99.

The digital signal processing circuit 99 controls operation of the entire rotational polarization wireless device 301. The digital signal processing circuit 99 includes an information signal processing function unit which processes information signals inputted through the delay devices 85 and 95, and a timing detection function unit (timing detection unit) for detecting a timing at which the strength of a polarization wave of each of the information signals exhibits a maximum value within a period of rotation. If the timing detection function unit of the digital signal processing circuit 99 detects a timing at which the strength of a reception signal exhibits a maximum value, then it sends a control signal for generating a cyclic code to be superimposed to the information signal from the information signal generator 1 to the cyclic code generation circuit 2.

Here, the information signal generator 1, cyclic code generation circuit 2, cosine rotation frequency generation circuit 4, sine rotation frequency generation circuit 14, multipliers 3, 5, 13 and 15, delay devices 85 and 95 and digital signal processing circuit 99 configure a digital rotational polarization wave transmission and reception module 101.

Also the rotational polarization wireless device 401 paired with the rotational polarization wireless device 301 has a configuration similar to that of the rotational polarization wireless device 301. In particular, the rotational polarization wireless device 401 generally includes a transmission system (transmission unit), a reception system (reception unit) and a signal processing system. The transmission system is configured from an information signal generator 51, a cyclic code generation circuit 52, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, a local oscillation circuit 39, multipliers 32 and 42, band-pass filters 33 and 43, buffer amplifiers 34 and 44 and delay devices 35 and 45. The signal processing system includes a digital signal processing circuit 49.

The information signal generator 51 generates an information signal (specific information signal for being transmitted to the rotational polarization wireless device 301, and branches the generated information signal into two branched signals. The cyclic code generation circuit 52 generates a cyclic code on the basis of a control signal from the digital signal processing circuit 49 and superimposes the generated cyclic code to one of the information signals outputted as two branch signals from the information signal generator 51 through the multiplier 53 and to the other of the information signals through the multiplier 63. The cosine rotation frequency generation circuit 54 and the sine rotation frequency generation circuit 64 generate signals having a relationship of a cosine wave and a sine wave, respectively. The cosine rotation frequency generation circuit 54 superimposes the generated signal to one of the information signals outputted as two branch signals from the information signal generator 51 by the multiplier 55, and the sine rotation frequency generation circuit 64 multiplies the generated signal to the other of the information signals outputted as two branch signals from the information signal generator 51 by the multiplier 65. The carrier frequency generation circuit 61 generates a carrier signal to be used for transmission of an information signal to the rotational polarization wireless device 301 and multiplies the generated carrier signal to the information signals outputted as two branch signals from the information signal generator 51 through the multipliers 58 and 68. The power amplifiers 59 and 69 amplify the information signals outputted as two branch signals from the information signal generator 51 and send the amplified information signals to the transmission antennae 60 and 70, respectively. The two transmission antennae 60 and 70 are disposed so as to be spatially orthogonal to each other, and the information signals sent through the power amplifiers 59 and 69 (carrier signals to which the information signals are superimposed) are radiated as electromagnetic waves (radio waves) into the space from the transmission antennae 60 and 70.

The two reception antennae 30 and 40 are disposed so as to be spatially orthogonal to each other and simultaneously receive electromagnetic waves (reception electric fields) radiated from the other rotational polarization wireless device 301. The electromagnetic waves received by the reception antennae 30 and 40 (information signals superimposed to the carrier signal) are amplified by the low noise amplifiers 31 and 41, respectively. The local oscillation circuit 39 generates a signal of a frequency same as that of the carrier signal, multiplies the generated signal to the information signals amplified by the low noise amplifiers 31 and 41 through the multipliers 32 and 42 and then send resulting signals to the band-pass filters 33 and 43, respectively. The information signals having passed the band-pass filters 33 and 43 are amplified by the buffer amplifiers 34 and 44 and sent to the delay devices 35 and 45, respectively. The delay devices 35 and 45 are each configured from a plurality of (for example, n) delay devices 35a, 35b, . . . , 35n, or 45a, 45b, . . . , 45n connected in cascade. The inputted information signals are successively delayed by the delay devices 35a, 35b, . . . , 35n, or 45a, 45b, . . . , 45n and inputted to the digital signal processing circuit 49.

The digital signal processing circuit 49 controls operation of the entire rotational polarization wireless device 401. The digital signal processing circuit 49 includes an information signal processing function unit which processes information signals inputted through the delay devices 35 and 45, and a timing detection function unit (timing detection unit) for detecting a timing at which the strength of a polarization wave of each of the information signals exhibits a maximum value within a period of rotation. If the timing detection function unit of the digital signal processing circuit 49 detects a timing at which the strength of a reception signal exhibits a maximum value, then it sends a control signal for generating a cyclic code to be superimposed to the information signal from the information signal generator 51 to the cyclic code generation circuit 52.

Here, the information signal generator 51, cyclic code generation circuit 52, cosine rotation frequency generation circuit 54, sine rotation frequency generation circuit 64, multipliers 53, 55, 63 and 65, delay devices 35 and 45 and digital signal processing circuit 49 configure a digital rotational polarization wave transmission and reception module 101a.

The present embodiment configured in such a manner as described above is described in more detail below.

Radio waves radiated from the transmission antennae 10 and 20 of the rotational polarization wireless device 301 and the transmission antennae 60 and 70 of the rotational polarization wireless device 401 are rotational polarization waves whose polarization plane rotates, and the carrier frequency and the cosine-sine rotational frequency are set such that the polarization waves rotate at a frequency sufficiently low in comparison with the frequency of the carrier. Further, the rotational polarization wireless devices 301 and 401 simultaneously communicate polarization waves changing the rotational polarization wave frequencies periodically. By setting the frequency of the rotational polarization waves sufficiently low, the transmission and reception timings of the rotational polarization wireless device 301 and the transmission and reception timings of the rotational polarization wireless device 401 can be made substantially same as each other. It is to be noted that preferably the rotational frequency of the rotational polarization waves is set such that the wavelength is sufficiently long (for example, more than five times) in comparison with the disposition distance between electromagnetic wave scattering bodies such as furniture a plurality of which are supposed to exist between the rotational polarization wireless devices 301 and 401.

A plurality of incoming waves which arrive at the rotational polarization wireless device 401 through a plurality of propagation paths from the rotational polarization wireless device 301 can be regarded, in regard to rotation of the polarization plane, as aligned in phase. Therefore, the incoming waves are regarded as a single rotational polarization wave which has a unique polarization angle difference from the transmission polarized waves and having a same rotational polarization wave frequency (one rotational polarization wave formed from the sum total of a plurality of polarization vectors). Since the rotational polarization wireless device 401 can know a strength distribution of polarized waves of a reception electric field by the reception antennae 30 and 40 which are spatially orthogonally disposed, if transmission polarization waves used by the rotational polarization wireless device 301 can be known, then it is possible to obtain a unique polarization angle difference arising in transmission and reception. The same is true for a plurality of incoming waves which arrive at the rotational polarization wireless device 301 through a plurality of propagation paths from the rotational polarization wireless device 401.

The unique polarization angle difference arising in transmission and reception sides between the pair of rotational polarization wireless devices 301 and 401 is automatically shared simultaneously between the rotational polarization wireless devices 301 and 401 which are communicating simultaneously from symmetry and relativity of communication which uses electromagnetic waves. Accordingly, even if radio wave environments surrounding the rotational polarization wireless devices 301 and 401 vary, they can automatically share a unique polarization angle difference following the variation.

Further, the unique polarization angle difference arising in transmission and reception between the paired rotational polarization wireless devices 301 and 401 is different from the unique polarization angle difference in a different rotational polarization wireless device pair (except a special case). In particular, even in a case in which pluralities of rotational polarization wireless devices are disposed, transmission paths in which the polarization angle difference is different among different rotational polarization wireless device pairs are virtually formed. Besides, the features of the propagation paths (polarization angle differences in transmission and reception) are concealed not only to the outside of the wireless communication system but also to the other wireless device pairs in the wireless communication system.

Further, outputs of the cyclic code generation circuits 2 and 52 are superimposed to outputs of the information signal generators 1 and 51 transmitted from the rotational polarization wireless devices 301 and 401, respectively. The rotational polarization wireless devices 301 and 401 paired with each other share a same cyclic code. One (transmission side) of the paired rotational polarization wireless devices 301 and 401 superimposes the shared cyclic code using a unique timing within a period of rotational polarization corresponding to the unique polarization angle difference (for example, a timing at which the signal strength of the reception signal exhibits a maximum value) as a start point while the other (reception side) of the paired rotational polarization wireless devices 301 and 401 takes a sliding correlation with the cyclic code of the reception signal and can know transmission polarization waves used by the paired rotational polarization wireless devices 301 and 401 from a timing at which the sliding correlation exhibits a maximum value.

Further, the cyclic code generation circuits 2 and 52 start generation of a cyclic code on the basis of control signals from digital signal processing circuits 99 and 49 at a unique timing within a period of rotational polarization corresponding to a unique polarization angle difference between the rotational polarization wireless devices 301 and 401 paired with each other, and the rotational polarization wireless devices 301 and 401 can correctly demodulate a signal transmitted from one to the other of the wireless devices by superimposing the cyclic code to the reception signal. Such operation is performed by the digital signal processing circuits 99 and 49 which control operation of the rotational polarization wireless devices 301 and 401, respectively. At a place other than the paired rotational polarization wireless devices 301 and 401, the unique polarization angle difference used by the paired rotational polarization wireless devices 301 and 401 cannot be obtained, and therefore, restoration of the transmission signal using the cyclic code cannot be performed.

Figure 14:
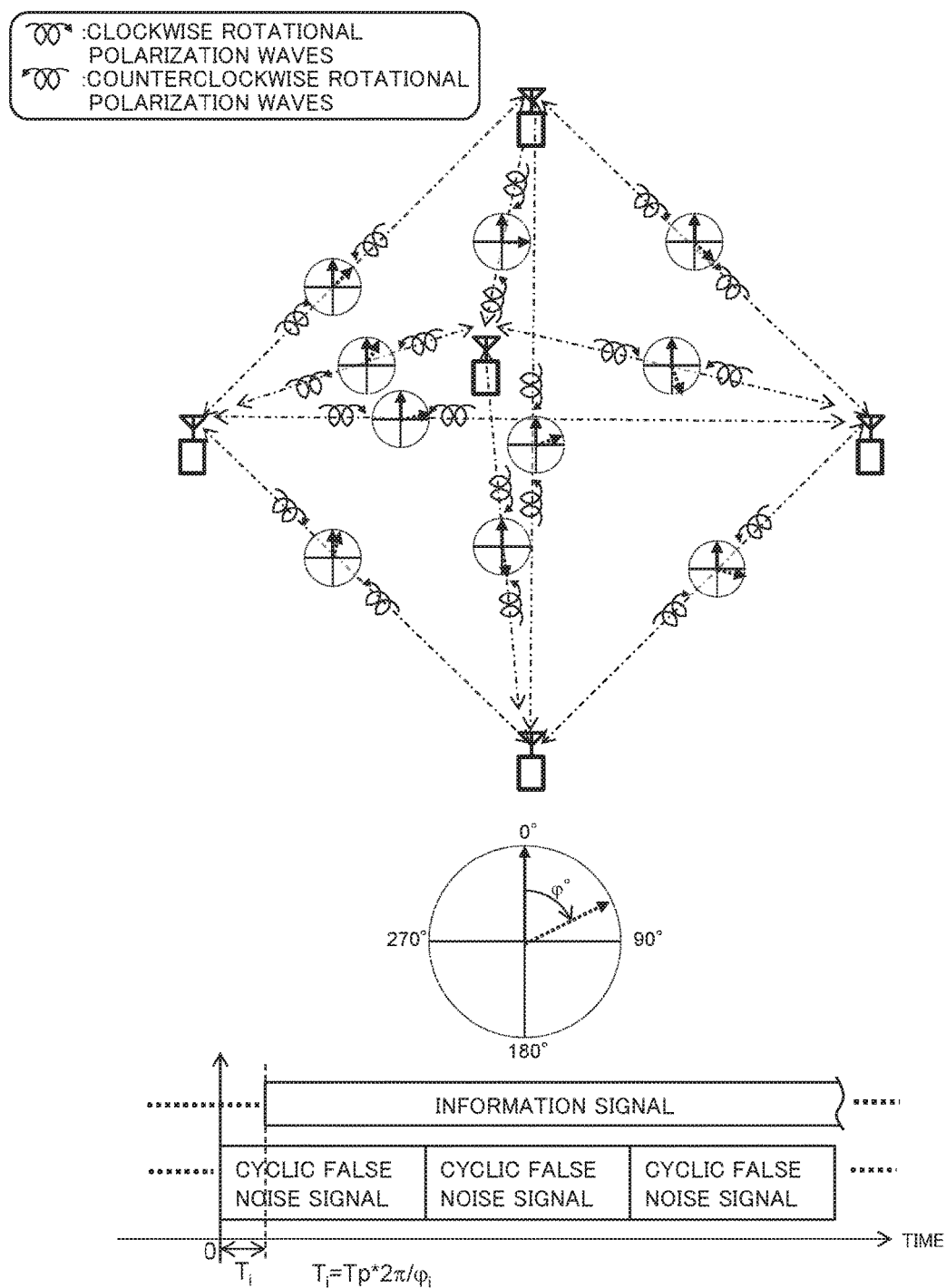
FIG. 14 is an explanatory view illustrating operation of the wireless communication system according to the first embodiment.

FIG. 14 is an explanatory view of operation of the wireless communication system according to the present embodiment.

In particular, FIG. 14 depicts an example of a configuration of a wireless communication system in which, using rotational polarization waves, information is concealed and transmitted using a unique polarization angle shift. Further, FIG. 14 illustrates correspondence between an information signal generated by an information generation circuit (information signal generator) and a cyclic code generated by a cyclic code generation circuit.

Referring to FIG. 14, a cyclic code generated by the cyclic code generation circuit of each rotational polarization wireless device indicates a low noise property. In particular, since an information signal to which a cyclic code is superimposed indicates a false noise property, it is recognized as noise by an outsider. Accordingly, the substance of the information in the information signal is concealed.

Further, since a pair of rotational polarization wireless devices communicate simultaneously using rotational polarization waves having different rotation directions, physical interference does not occur between the rotational polarization waves and bidirectional simultaneous communication by the paired rotational polarization wireless devices can be achieved.

Advantageous effects of the present invention having such a configuration as described above are described below.

Since a social infrastructure system plays an important role to provide a lifeline to the society, it is necessary to strictly restrict intervention in the system by an outsider, and the security in operation of the network is very important. Generally, in wireless communication, a transmission path is an open space, and therefore, it is very difficult to specify a specific transmission path in comparison with wire communication. However, in the proximity of the system, even an outsider can easily acquire energy of wireless communication. Therefore, the possibility of discovery of or intervention in the transmission path by an outsider cannot be denied, and this is a technical subject to be solved from the point of view of the security.

In contract, in the present embodiment, a wireless devices which includes a transmission unit configured to transmit a carrier of a fixed strength with polarization waves thereof rotated to a different one of the wireless devices using two antennae spatially orthogonal to each other, a reception unit configured to receive a carrier transmitted from the transmission unit of the different wireless device, and a timing detection unit configured to detect a timing at which the polarization waves of the carrier received by the reception unit within a period of rotation indicates a maximum strength is configured such that the transmission unit performs transmission or reception of a specific information signal using the carrier based on the timing detected by the timing detection unit. Therefore, transmission information by wireless communication can be concealed against an outsider.

Since electromagnetic waves are vector waves and physical realities called polarization waves orthogonal to the advancing direction indicate a unique variation by reflection, polarization waves of same polarization automatically radiated in a plurality of directions from a certain wireless device are reflected uniquely by a plurality of structures. Therefore, at a wireless device on the reception side, radio waves subject to unique variations of the polarization waves through a plurality of propagation paths arrive.

In communication between a pair of wireless devices, the sum total of the polarization vectors is unique between a pair of transmission and reception points and varies temporally irregularly. Besides, the information cannot be physically recognized except the pair of transmission and reception points. Therefore, the polarization angle between a transmission polarization wave and a reception polarization wave is a physical amount which cannot be recognized except a specific pair of wireless devices (transmitter and receiver). Further, in the present embodiment, since the wireless communication system is configured so as to conceal information to be used using the physical amount on the basis of the knowledge that a pair of specific wireless devices can simultaneously share an irregular variation of the physical amount by the transmission-reception symmetry, specification of a transmission path for information transmission by an outsider can be prevented and the substance of information being transmitted can be concealed.

Second Embodiment

A second embodiment of the present invention is described in detail with reference to FIG. 2.

In the present embodiment, a single reception antenna is used commonly to the reception units of the rotational polarization wireless devices paired with each other in the first embodiment.

Figure 2:
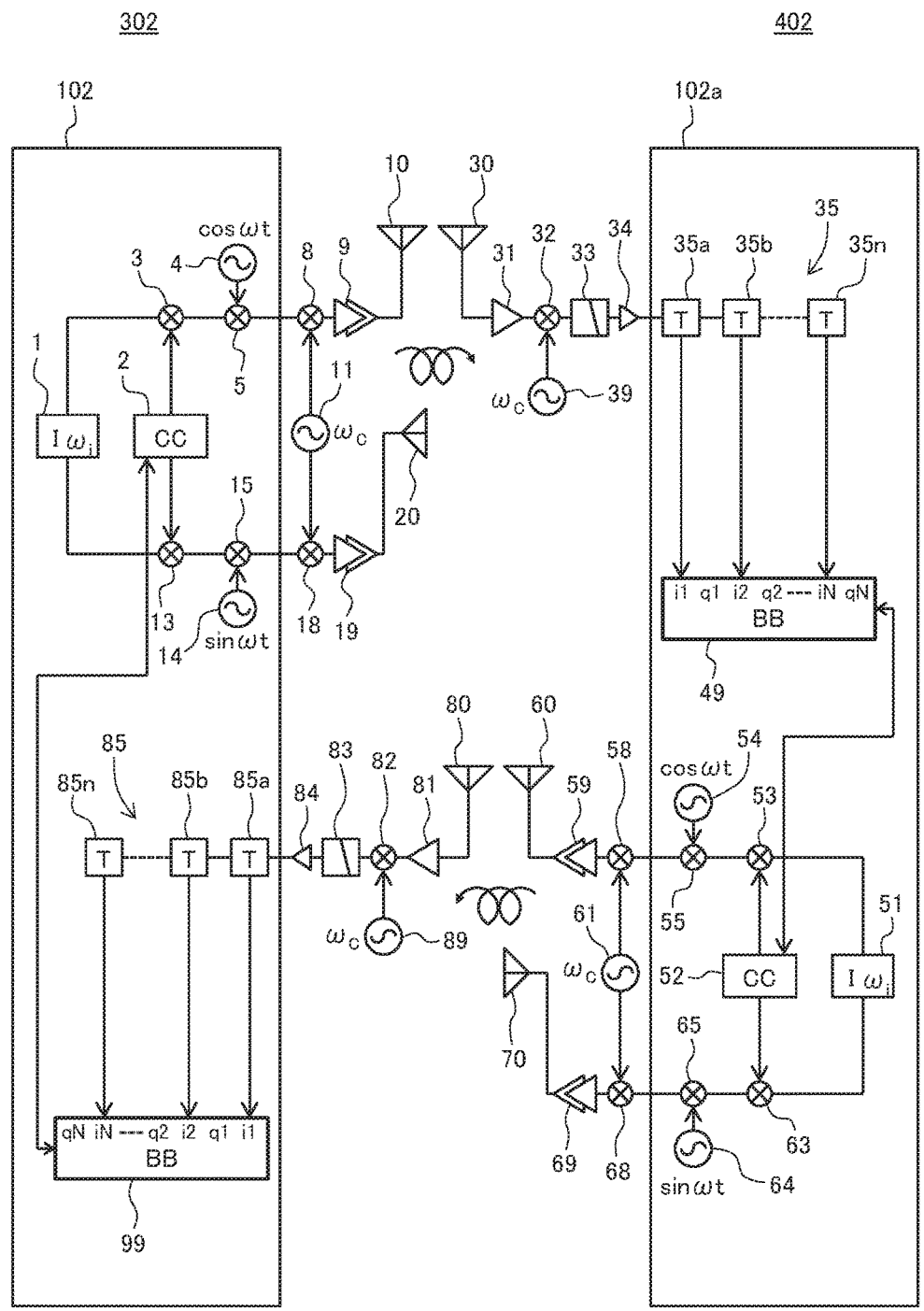
FIG. 2 is a block diagram schematically depicting a wireless communication system according to a second embodiment.

FIG. 2 is a view schematically depicting a wireless communication system according to the present embodiment, In FIG. 2, like elements to those in the first embodiment are denoted by like reference characters, and overlapping description of them is omitted herein.

FIG. 2 exemplifies a set of wireless devices extracted from a plurality of wireless devices which configure the wireless communication system, namely, exemplifies rotational polarization wireless devices 302 and 402. Referring to FIG. 2, the rotational polarization wireless device 302 generally includes a transmission system (transmission unit), a reception system (reception unit) and a signal processing system. The transmission system is configured from an information signal generator 1, an cyclic code generation circuit 2, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from a reception antenna 80, a low noise amplifier 81, a local oscillation circuit 89, a multiplier 82, a band-pass filter 83, a buffer amplifier 84 and a delay device 85. The signal processing system includes a digital signal processing circuit 99. The information signal generator 1, cyclic code generation circuit 2, cosine rotation frequency generation circuit 4, sine rotation frequency generation circuit 14, multipliers 3, 5, 13 and 15, delay device 85 and digital signal processing circuit 99 configure a digital rotational polarization wave transmission and reception module 102.

Also the rotational polarization wireless device 402 paired with the rotational polarization wireless device 302 has a configuration similar to that of the rotational polarization wireless device 302. In particular, the rotational polarization wireless device 402 generally includes a transmission system (transmission unit), a reception system (reception unit) and a signal processing system. The transmission system is configured from an information signal generator 51, an cyclic code generation circuit 52, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from a reception antenna 30, a low noise amplifier 31, a local oscillation circuit 39, a multiplier 32, a band-pass filter 33, a buffer amplifier 34 and a delay device 35. The signal processing system includes a digital signal processing circuit 49. The information signal generator 51, cyclic code generation circuit 52, cosine rotation frequency generation circuit 54, sine rotation frequency generation circuit 64, multipliers 53, 55, 63 and 65, delay device 35 and digital signal processing circuit 49 configure a digital rotational polarization wave transmission and reception module 102a.

The configuration of the other part of the wireless communication system is similar to that in the first embodiment.

Also with the present embodiment configured in such a manner as described above, similar advantageous effects to those of the first embodiment can be achieved.

Further, in the present embodiment, although the reception system (reception unit) of the rotational polarization wireless devices 302 and 402 requires at least a period of time equivalent to one cycle of rotational polarization waves in order to obtain a timing which exhibits a maximum value of the reception electric field strength, since the components of the circuit configuration of the rotational polarization wireless device 302 can be reduced significantly, the fabrication cost for the rotational polarization wireless devices for configuring the wireless communication system can be reduced.

Third Embodiment

A third embodiment of the present invention is described in detail with reference to FIG. 3.

The present embodiment is configured such that one of a pair of rotational polarization wireless devices in the first embodiment is configured as a fixed polarization wireless device having no function for transmitting and receiving a rotational polarization wave.

Figure 3:
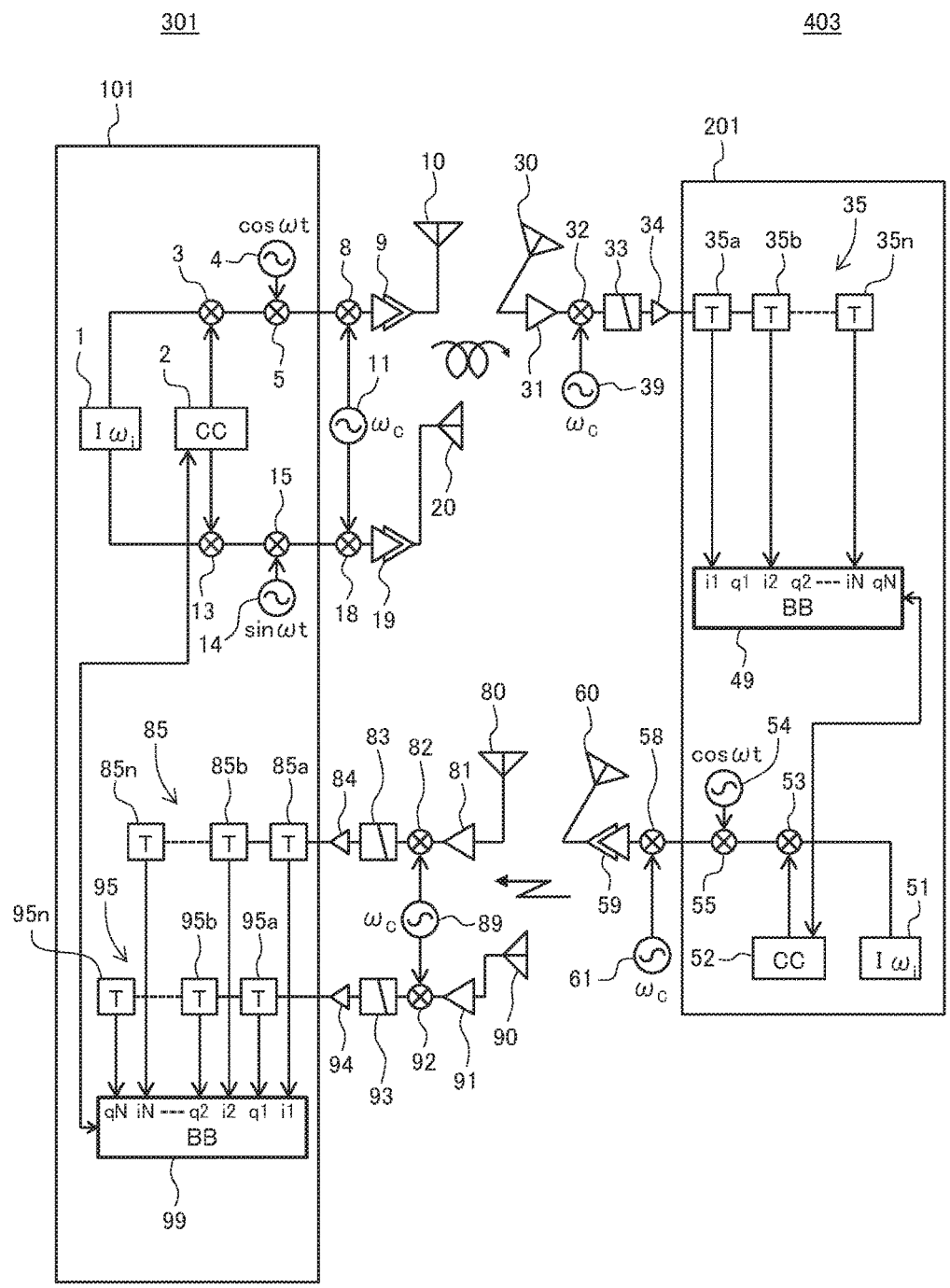
FIG. 3 is a block diagram schematically depicting a wireless communication system according to a third embodiment.

FIG. 3 is a view schematically depicting a wireless communication system according to the present embodiment, In FIG. 3, like elements to those in the first embodiment are denoted by like reference characters, and overlapping description of them is omitted herein.

FIG. 3 exemplifies a set of wireless devices extracted from a plurality of wireless devices which configure the wireless communication system, namely, exemplifies a rotational polarization wireless device 301 and a fixed polarization wireless device 403. Referring to FIG. 3, the rotational polarization wireless device 301 generally includes a transmission system (transmission unit), a reception system (reception unit) and a signal processing system. The transmission system is configured from an information signal generator 1, an cyclic code generation circuit 2, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99. The information signal generator 1, cyclic code generation circuit 2, cosine rotation frequency generation circuit 4, sine rotation frequency generation circuit 14, multipliers 3, 5, 13 and 15, delay devices 85 and 95 and digital signal processing circuit 99 configure a digital rotational polarization wave transmission and reception module 101.

The fixed polarization wireless device 403 paired with the rotational polarization wireless device 301 generally includes a transmission system (transmission unit), a reception system (reception unit) and a signal processing system. The transmission system is configured from an information signal generator 51, a cyclic code generation circuit 52, a cosine rotation frequency generation circuit 54, a carrier frequency generation circuit 61, a power amplifier 59, a transmission antenna 60, and multipliers 53, 55 and 58. The reception system is configured from a reception antenna 30, a low noise amplifier 31, a local oscillation circuit 39, a multiplier 32, band-pass filter 33, a buffer amplifier 34 and a delay device 35. The signal processing system includes a digital signal processing circuit 49. The information signal generator 51, cyclic code generation circuit 52, cosine rotation frequency generation circuit 54, multipliers 53 and 55, delay device 35 and digital signal processing circuit 49 configure a digital rotational polarization wave transmission and reception module 201.

In the wireless communication system configured in such a manner as described above, in the reception unit of the fixed polarization wireless device 403, radio waves (reception signal) received by the reception antenna 30 are amplified by the low noise amplifier 31 and then multiplied by an output of the local oscillation circuit 39, which generates a signal of a frequency equal to the frequency of the carrier, by the multiplier 32. The reception signal after the output of the local oscillation circuit 39 is multiplied is inputted to the buffer amplifier 34 through the band-pass filter 33, and an output of the buffer amplifier 34 is successively delayed by the delay device 35 and then inputted to the digital signal processing circuit 49.

Meanwhile, in the transmission unit of the fixed polarization wireless device 403, an output of the cyclic code generation circuit 52 is superimposed to an output of the information signal generator 51 by the multiplier 53 and then is multiplied by an output of the cosine rotation frequency generation circuit 54 by the multiplier 55, whereafter it is multiplied by an output of the carrier frequency generation circuit 61 by the multiplier 58. Then, a resulting signal is amplified by the power amplifier 59 and radiated from the transmission antenna 60 into the space.

The fixed polarization wireless device 403 receives rotational polarization waves and receives a control signal from the digital signal processing circuit 49 at a timing at which a maximum reception electric field strength is obtained and then starts generation of a cyclic code of the cyclic code generation circuit 52. An output of the information signal generator 51 is superimposed to an output of the cyclic code generation circuit 52 by the multiplier 53 and is multiplied by an output of the cosine rotation frequency generation circuit 54 by the multiplier 55, whereafter it is multiplied by an output of the carrier frequency generation circuit 61 by the multiplier 58. Then, a resulting signal is amplified by the power amplifier 59 and radiated from the transmission antenna 60 into the space.

In the rotational polarization wireless device 301, the digital signal processing circuit 99 takes sliding correlation with the reception signal using the cyclic code shared by the fixed polarization wireless device 403 and extracts a timing at which the signal strength indicates a maximum value. Then, the digital signal processing circuit 99 recognizes a relative position of the timing on the time axis to the timing of the polarization rotation of the rotational polarization waves used for transmission by the fixed polarization wireless device 403.

The configuration of the other part of the wireless communication system is similar to that in the first embodiment.

Also with the present embodiment configured in such a manner as described above, similar advantageous effects to those of the first embodiment can be achieved.

Further, with the present embodiment, since a pair of wireless devices (a rotational polarization wireless device and a fixed polarization wireless device) are different in operation from each other, the symmetry in transmission and reception is not satisfied between the wireless devices. Accordingly, it is impossible in principle to obtain relative positions on a time axis of timings of rotational polarization waves transmitted simultaneously and timings of received rotational polarization waves between the paired wireless devices. However, it is possible to obtain relative position on a time axis of rotational polarization waves transmitted approximately as errors given by differences in propagation delay between transmission and reception and time transition relating to a processing time period of the digital signal processing circuit 99 and received rotational propagation waves. Particularly, if the difference in time transition with respect to the rotational polarization waves is so small that it can be ignored, then it is possible in practical use to obtain relative positions on a time axis of timings of rotational polarization waves to be transmitted and received rotational polarization waves with a small error. In other words, in the present embodiment, since the fixed polarization wireless device 403 can be configured in a much simplified configuration in comparison with the rotational polarization wireless device 301, scaling down of the component apparatus of the wireless communication system and reduction of the cost for the entire wireless communication system can be anticipated.

Fourth Embodiment

A fourth embodiment of the present invention is described in detail below with reference to FIG. 4.

The present embodiment is configured such that the paired rotational polarization wireless devices in the first embodiment include a synchronization code generation circuit in addition to the cyclic code generation circuit.

Figure 4:
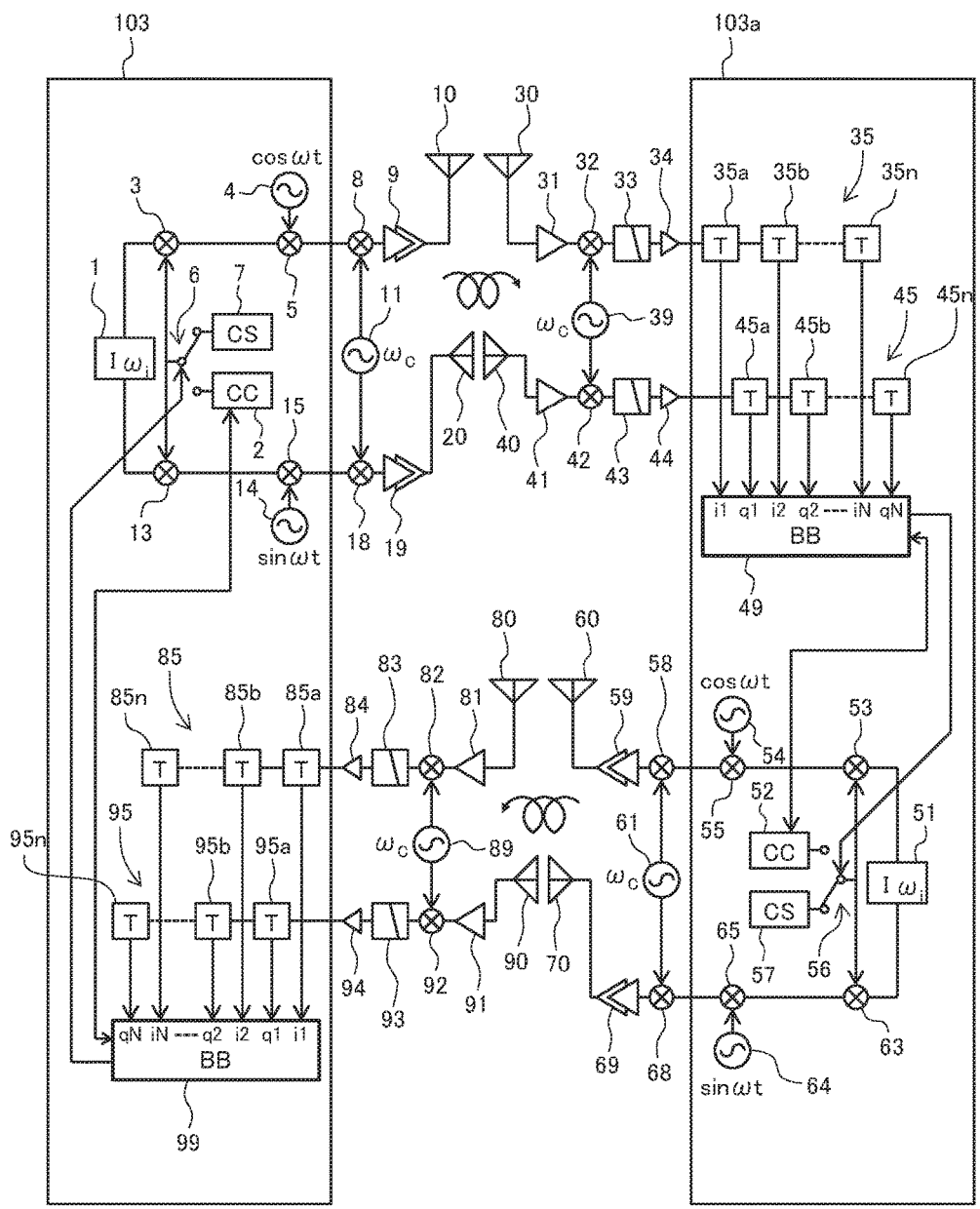
FIG. 4 is a block diagram schematically depicting a wireless communication system according to a fourth embodiment.

FIG. 4 is a view schematically depicting the wireless communication system according to the present embodiment. In FIG. 4, like elements to those in the first embodiment are denoted by like reference characters, and overlapping description of them is omitted herein.

FIG. 4 exemplifies a set of wireless devices extracted from a plurality of wireless devices which configure the wireless communication system, namely, exemplifies rotational polarization wireless devices 304 and 404. Referring to FIG. 4, the rotational polarization wireless device 304 generally includes a transmission system (transmission unit), a reception system (reception unit) and a signal processing system. The transmission system is configured from an information signal generator 1, an cyclic code generation circuit 2, a synchronization code generation circuit 7, a switch 6, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99. The information signal generator 1, cyclic code generation circuit 2, synchronization code generation circuit 7, switch 6, cosine rotation frequency generation circuit 4, sine rotation frequency generation circuit 14, multipliers 3, 5, 13 and 15, delay devices 85 and 95 and digital signal processing circuit 99 configure a digital rotational polarization wave transmission and reception module 103.

Also the rotational polarization wireless device 404 paired with the rotational polarization wireless device 304 has a configuration similar to that of the rotational polarization wireless device 304. In particular, the rotational polarization wireless device 404 generally includes a transmission system (transmission unit), a reception system (reception unit) and a signal processing system. The transmission system is configured from an information signal generator 51, an cyclic code generation circuit 52, a synchronization code generation circuit 57, a switch 56, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, a local oscillation circuit 39, multipliers 32 and 42, band-pass filters 33 and 43, buffer amplifiers 34 and 44 and delay devices 35 and 45. The signal processing system includes a digital signal processing circuit 49. The information signal generator 51, cyclic code generation circuit 52, synchronization code generation circuit 57, switch 56, cosine rotation frequency generation circuit 54, sine rotation frequency generation circuit 64, multipliers 53, 55, 63 and 65, delay devices 35 and 45 and digital signal processing circuit 49 configure a digital rotational polarization wave transmission and reception module 103a.

The rotational polarization wireless devices 304 and 404 perform switching between outputs of the cyclic code generation circuits 2 and 52 and outputs of the synchronization code generation circuits 7 and 57 in accordance with control signals of the digital signal processing circuits 99 and 49 by switches 6 and 56 to switch codes to be superimposed to outputs of the information signal generators 1 and 51 between cyclic codes and synchronization codes, respectively. The rotational polarization wireless devices 304 and 404 change codes to be superimposed to information signals within a period of time within which communication is performed from cyclic codes generated by the cyclic code generation circuits 2 and 52 to synchronization codes outputted from the synchronization code generation circuits 7 and 57, respectively. The synchronization codes generated by the synchronization code generation circuits 7 and 57 are set such that they have a stronger correlation in comparison with the cyclic codes generated by the cyclic code generation circuits 2 and 52.

The configuration of the other part of the wireless communication system is similar to that in the first embodiment.

Also with the present embodiment configured in such a manner as described above, similar advantageous effects to those of the first embodiment can be achieved.

Further, since switching to a synchronization code having a higher correlation than a cyclic signal is used, the paired rotational polarization wireless devices 304 and 404 can acquire timings of the two wireless devices which use a synchronization signal to establish synchronism. Accordingly, the detection accuracy of relative positions on a time axis of timings of a polarization wave transmitted and received between rotational polarization wireless devices configuring the wireless communication system and received polarization waves can be improved, and reproduction of an information signal transmitted in a concealed state can be stabilized.

Fifth Embodiment

A fifth embodiment of the present invention is described in detail with reference to FIG. 5.

In the present embodiment, the paired rotational polarization wireless devices in the first embodiment additionally include a time generation circuit.

Figure 5:
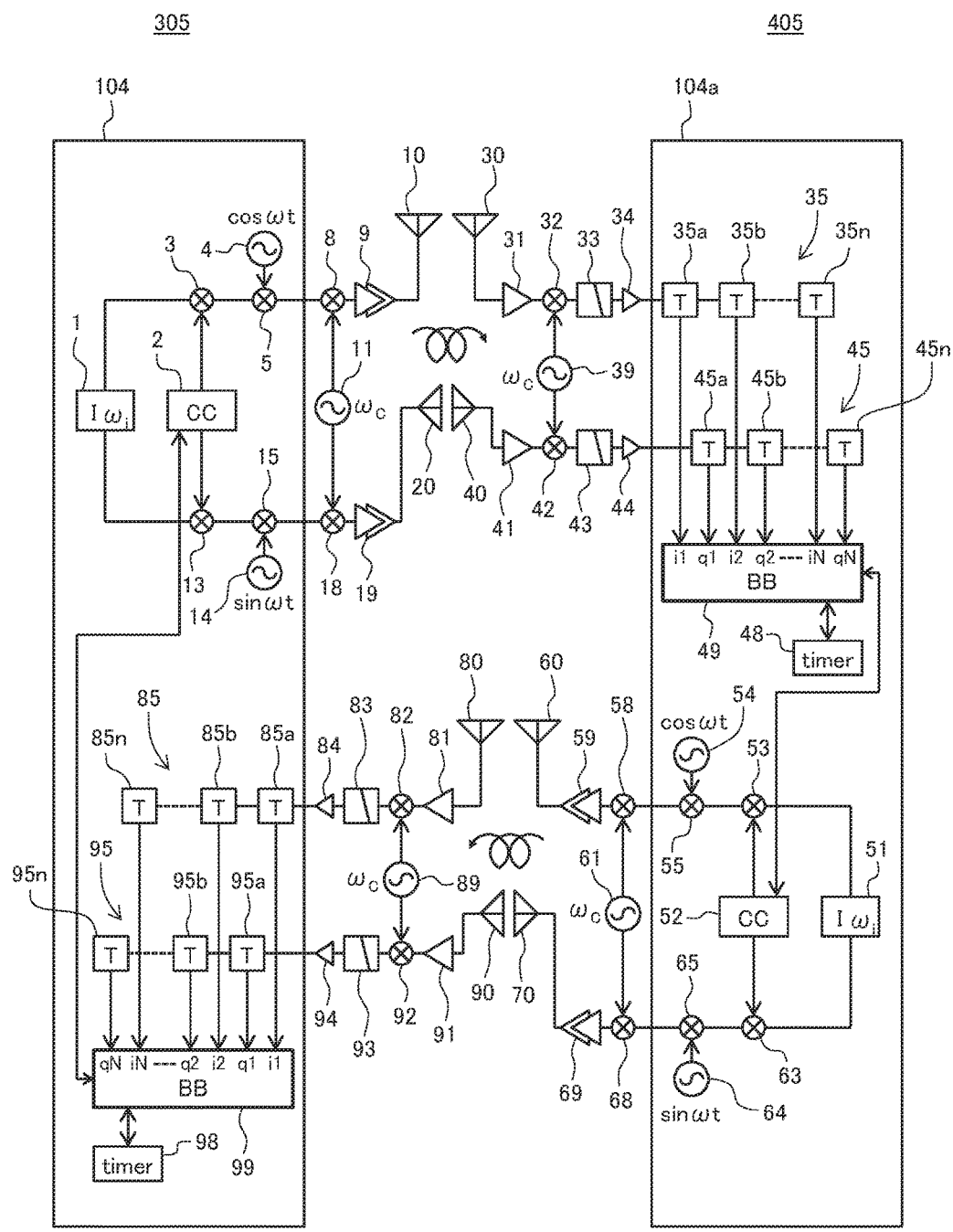
FIG. 5 is a block diagram schematically depicting a wireless communication system according to a fifth embodiment.

FIG. 5 is a view schematically depicting a wireless communication system according to the present embodiment. In FIG. 5, like elements to those in the first embodiment are denoted by like reference characters, and overlapping description of them is omitted herein.

FIG. 5 exemplifies a set of wireless devices extracted from a plurality of wireless devices which configure the wireless communication system, namely, exemplifies rotational polarization wireless devices 305 and 405. Referring to FIG. 5, the rotational polarization wireless device 305 generally includes a transmission system (transmission unit), a reception system (reception unit) and a signal processing system. The transmission system is configured from an information signal generator 1, an cyclic code generation circuit 2, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a time generation circuit 98 and a digital signal processing circuit 99. The information signal generator 1, cyclic code generation circuit 2, cosine rotation frequency generation circuit 4, sine rotation frequency generation circuit 14, multipliers 3, 5, 13 and 15, delay devices 85 and 95, time generation circuit 98 and digital signal processing circuit 99 configure a digital rotational polarization wave transmission and reception module 104.

Also the rotational polarization wireless device 405 paired with the rotational polarization wireless device 305 has a configuration similar to that of the rotational polarization wireless device 305. In particular, the rotational polarization wireless device 405 generally includes a transmission system (transmission unit), a reception system (reception unit) and a signal processing system. The transmission system is configured from an information signal generator 51, an cyclic code generation circuit 52, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, local oscillation circuit 39, multipliers 32 and 42, band-pass filters 33 and 43, buffer amplifiers 34 and 44 and delay devices 35 and 45. The signal processing system includes a time generation circuit 48 and a digital signal processing circuit 49. The information signal generator 51, cyclic code generation circuit 52, cosine rotation frequency generation circuit 54, sine rotation frequency generation circuit 64, multipliers 53, 55, 63 and 65, delay devices 35 and 45, time generation circuit 48 and digital signal processing circuit 49 configure a digital rotational polarization wave transmission and reception module 104a.

In the rotational polarization wireless devices 305 and 405, the digital signal processing circuits 49 and 99 detect timings at which the strengths of polarization waves in information signals exhibit maximum values within a rotation period and store the timings into the time generation circuits 48 and 98, respectively. After the values are stored into the time generation circuits 48 and 98, within a fixed period determined in advance, the digital signal processing circuits 49 and 99 determine timings for cyclic code generation by the cyclic code generation circuits 52 and 2 (transmission timings of control signals), using the output (the stored time; timing) of the time generation circuits 48 and 98. Further, after the fixed period of time elapses, the digital signal processing circuits 49 and 99 newly detect timings at which the strengths within a rotation period of polarization waves of the information signals exhibit maximum values and store the detected timings in an overwriting manner into the time generation circuits 48 and 98, respectively.

The configuration of the other part of the wireless communication system is similar to that in the first embodiment.

Also with the present embodiment configured in such a manner as described above, similar advantageous effects to those of the first embodiment can be achieved.

Further, since operation of the digital signal processing circuits 49 and 99 including the rotational polarization wireless devices 305 and 405 can be simplified, power consumption of the rotational polarization wireless devices 305 and 405 can be reduced and power consumption of the entire wireless communication system can be reduced.

Sixth Embodiment

A sixth embodiment of the present invention is described in detail with reference to FIG. 6.

The present embodiment is configured such that the paired rotational polarization wireless devices in the first embodiment include, in addition to a cyclic code generation circuit, a synchronization code generation circuit and additionally includes a time generation circuit. In other words, the present embodiment has the feathers of the wireless communication systems of both of the fourth and fifth embodiments.

Figure 6:
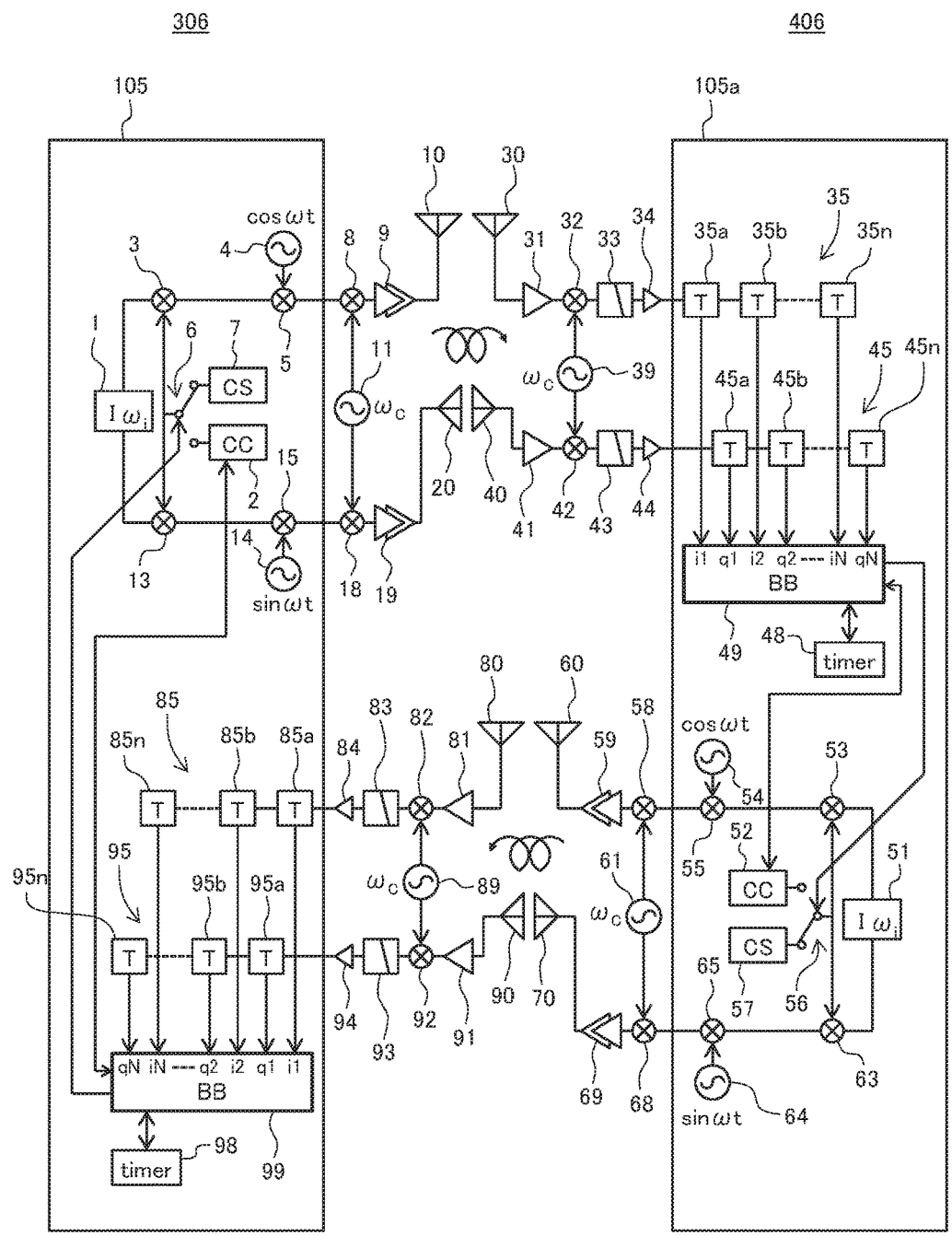
FIG. 6 is a block diagram schematically depicting a wireless communication system according to a sixth embodiment.

FIG. 6 is a view schematically depicting a wireless communication system according the present embodiment. In FIG. 6, like elements to those in the first, fourth and fifth embodiments are denoted by like reference characters, and overlapping description of them is omitted herein.

FIG. 6 exemplifies a set of wireless devices extracted from a plurality of wireless devices which configure the wireless communication system, namely, exemplifies rotational polarization wireless devices 306 and 406. Referring to FIG. 6, the rotational polarization wireless device 306 generally includes a transmission system (transmission unit), a reception system (reception unit) and a signal processing system. The transmission system is configured from an information signal generator 1, an cyclic code generation circuit 2, a synchronization code generation circuit 7, a switch 6, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a time generation circuit 98 and a digital signal processing circuit 99. The information signal generator 1, cyclic code generation circuit 2, synchronization code generation circuit 7, switch 6, cosine rotation frequency generation circuit 4, sine rotation frequency generation circuit 14, multipliers 3, 5, 13 and 15, delay devices 85 and 95, time generation circuit 98 and digital signal processing circuit 99 configure a digital rotational polarization wave transmission and reception module 105.

Also the rotational polarization wireless device 406 paired with the rotational polarization wireless device 306 has a configuration similar to that of the rotational polarization wireless device 306. In particular, the rotational polarization wireless device 406 generally includes a transmission system (transmission unit), a reception system (reception unit) and a signal processing system. The transmission system is configured from an information signal generator 51, an cyclic code generation circuit 52, a synchronization code generation circuit 57, a switch 56, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, a local oscillation circuit 39, multipliers 32 and 42, band-pass filters 33 and 43, buffer amplifiers 34 and 44 and delay devices 35 and 45. The signal processing system includes a time generation circuit 48 and a digital signal processing circuit 49. The information signal generator 51, cyclic code generation circuit 52, synchronization code generation circuit 57, switch 56, cosine rotation frequency generation circuit 54, sine rotation frequency generation circuit 64, multipliers 53, 55, 63 and 65, delay devices 35 and 45, time generation circuit 48 and digital signal processing circuit 49 configure a digital rotational polarization wave transmission and reception module 105*a*.

The configuration of the other part of the wireless communication system is similar to that in the first embodiment.

Also with the present embodiment configured in such a manner as described above, similar advantageous effects to those of the first, fourth and fifth embodiments can be achieved.

Seventh Embodiment

A seventh embodiment of the present invention is described in detail with reference to FIG. 7.

The present embodiment includes a cyclic code generation circuit array in place of the cyclic code generation circuit in the sixth embodiment.

Figure 7:
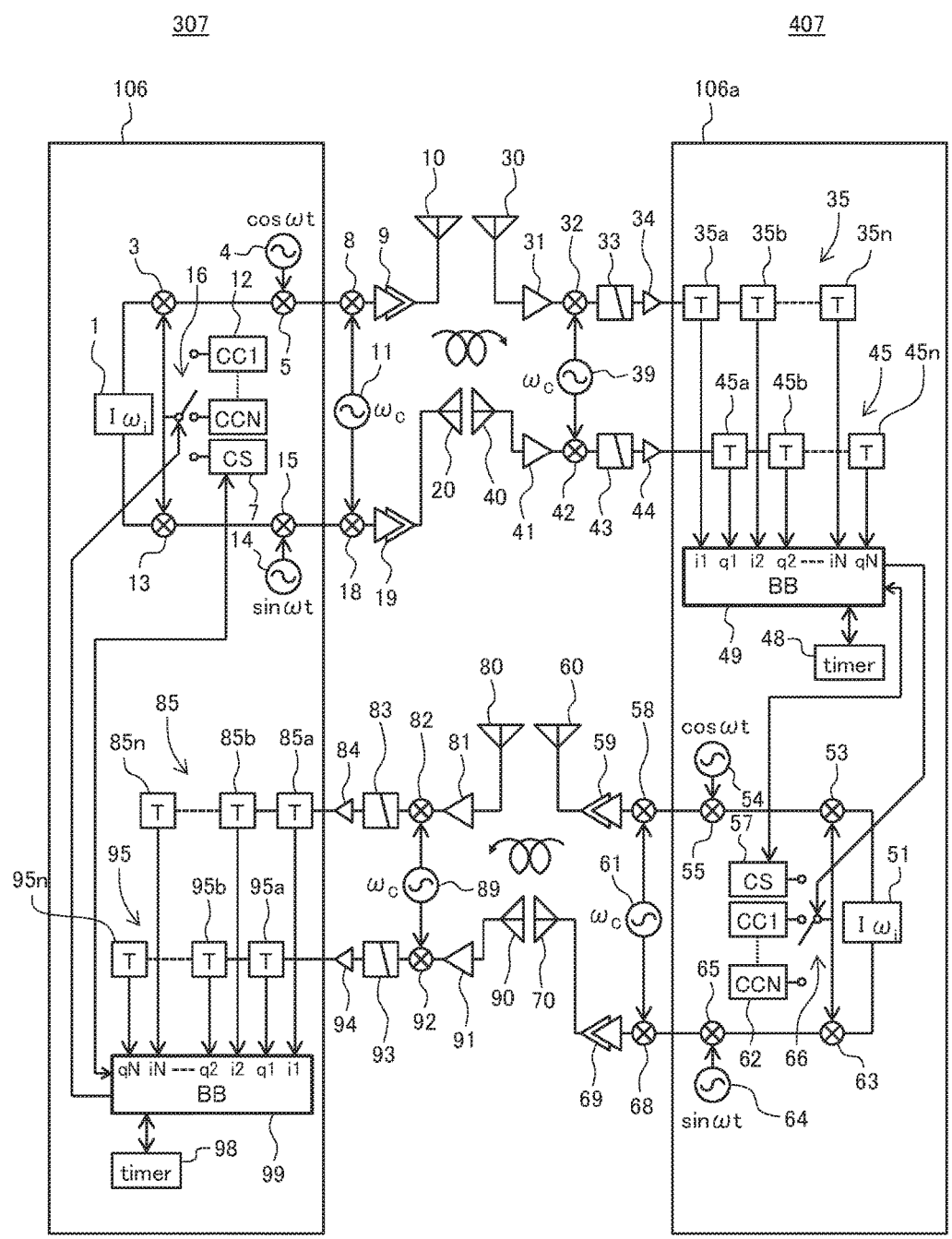
FIG. 7 is a block diagram schematically depicting a wireless communication system according to a seventh embodiment.

FIG. 7 is a view schematically depicting a wireless communication system according to the present embodiment. In FIG. 7, like elements to those in the sixth embodiment are denoted by like reference characters, and overlapping description of them is omitted herein.

FIG. 7 exemplifies a set of wireless devices extracted from a plurality of wireless devices which configure the wireless communication system, namely, exemplifies rotational polarization wireless devices 307 and 407. Referring to FIG. 7, the rotational polarization wireless device 307 generally includes a transmission system (transmission unit), a reception system (reception unit) and a signal processing system. The transmission system is configured from an information signal generator 1, a cyclic code generation circuit array 12, a synchronization code generation circuit 7, a switch 16, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a time generation circuit 98 and a digital signal processing circuit 99. The information signal generator 1, cyclic code generation circuit array 12, synchronization code generation circuit 7, switch 16, cosine rotation frequency generation circuit 4, sine rotation frequency generation circuit 14, multipliers 3, 5, 13 and 15, delay devices 85 and 95, time generation circuit 98 and digital signal processing circuit 99 configure a digital rotational polarization wave transmission and reception module 106.

Also the rotational polarization wireless device 407 paired with the rotational polarization wireless device 307 has a configuration similar to that of the rotational polarization wireless device 307. In particular, the rotational polarization wireless device 407 generally includes a transmission system (transmission unit), a reception system (reception unit) and a signal processing system. The transmission system is configured from an information signal generator 51, a cyclic code generation circuit array 62, a synchronization code generation circuit 57, a switch 66, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, a local oscillation circuit 39, multipliers 32 and 42, band-pass filters 33 and 43, buffer amplifiers 34 and 44 and delay devices 35 and 45. The signal processing system includes a time generation circuit 48 and a digital signal processing circuit 49. The information signal generator 51, cyclic code generation circuit array 62, synchronization code generation circuit 57, switch 66, cosine rotation frequency generation circuit 54, sine rotation frequency generation circuit 64, multipliers 53, 55, 63 and 65, delay devices 35 and 45, time generation circuit 48 and digital signal processing circuit 49 configure a digital rotational polarization wave transmission and reception module 106a.

In the paired rotational polarization wireless devices 307 and 407, the cyclic code generation circuit arrays 12 and 62 generate cyclic codes different from each other but having a weak correlation to each other. The switches 16 and 66 select codes different from each other generated by the cyclic code generation circuit arrays 12 and 62 on the basis of control signals from the digital signal processing circuits 99 and 49, respectively, and superimpose the selected codes to outputs of the information signal generators 1 and 51 through the multipliers 3, 13 and 53, 63, respectively. By the weak correlation of codes different from each other to be superimposed to outputs of the information signal generators 1 and 51, the rotational polarization wireless devices 307 and 407 can identify a plurality of rotational polarization wireless devices other than the own rotation polarization wireless device.

The configuration of the other part of the wireless communication system is similar to that in the sixth embodiment.

Also with the present embodiment configured in such a manner as described above, similar advantageous effects to those of the sixth embodiment can be achieved.

Further, by switching the cyclic code generation circuit arrays 12 and 62, it is possible to communicate information to be transmitted in a concealed state with a plurality of rotational polarization wireless devices. Therefore, the region on a time axis in which a plurality of rotational polarization wireless devices configuring the wireless communication system can communicate simultaneously increases, and the throughput of signal transmission in the wireless communication system can be improved.

Eighth Embodiment

An eighth embodiment of the present invention is described in detail with reference to FIG. 8.

The present embodiment is configured such that a communication state storage apparatus and a data bus are provided additionally in the seventh embodiment.

Figure 8:
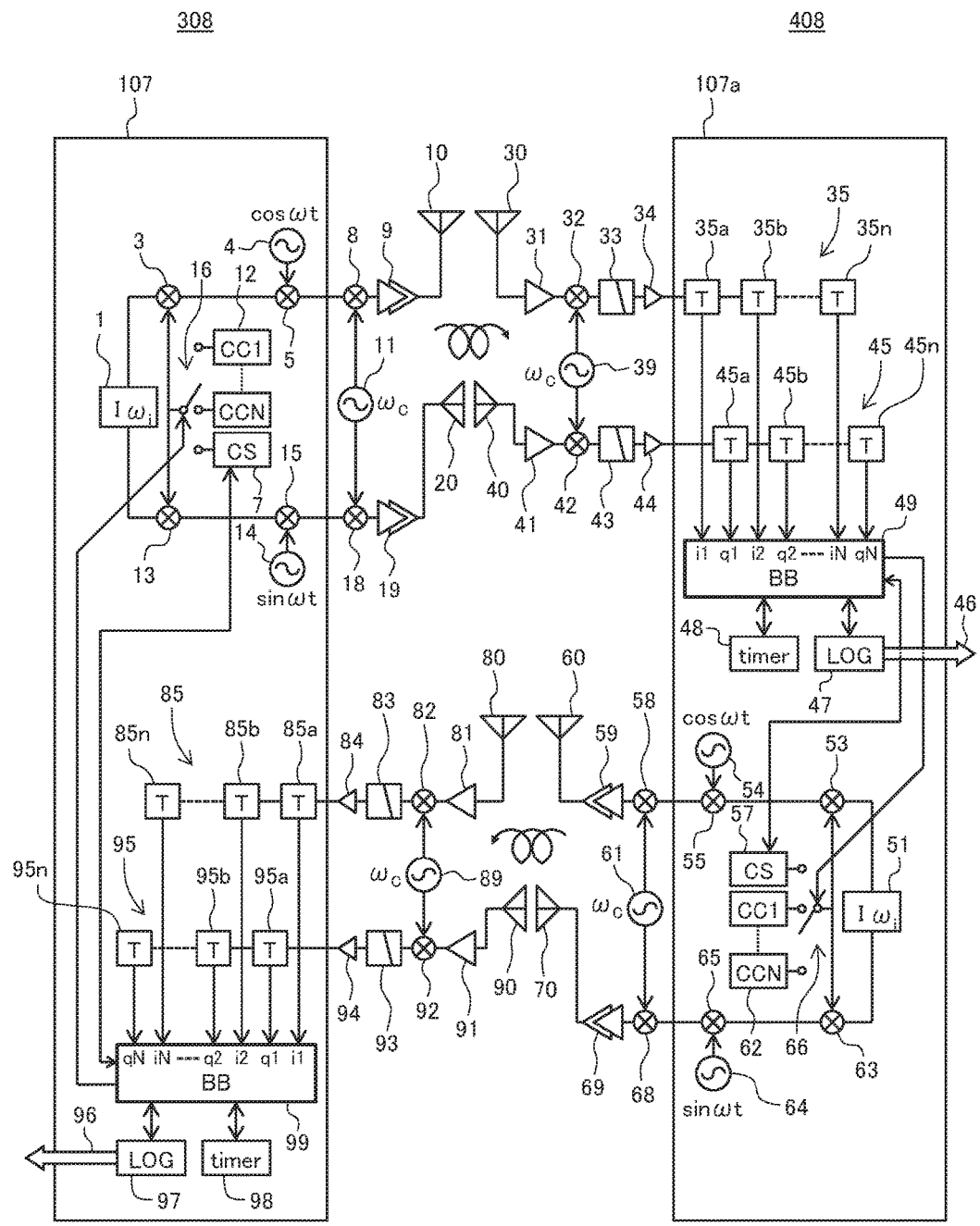
FIG. 8 is a block diagram schematically depicting a wireless communication system according to an eighth embodiment.

FIG. 8 schematically depicts a wireless communication system according to the present embodiment. In FIG. 8, like elements to those in the seventh embodiment are denoted by like reference characters, and overlapping description of them is omitted herein.

FIG. 8 exemplifies a set of wireless devices extracted from a plurality of wireless devices which configure the wireless communication system, namely, exemplifies rotational polarization wireless devices 308 and 408. Referring to FIG. 8, the rotational polarization wireless device 308 generally includes a transmission system (transmission unit), a reception system (reception unit) and a signal processing system. The transmission system is configured from an information signal generator 1, a cyclic code generation circuit array 12, a synchronization code generation circuit 7, a switch 16, a cosine rotation frequency generation circuit 4, a sine rotation frequency generation circuit 14, a carrier frequency generation circuit 11, power amplifiers 9 and 19, transmission antennae 10 and 20 and multipliers 3, 5, 8, 13, 15 and 18. The reception system is configured from reception antennae 80 and 90, low noise amplifiers 81 and 91, a local oscillation circuit 89, multipliers 82 and 92, band-pass filters 83 and 93, buffer amplifiers 84 and 94 and delay devices 85 and 95. The signal processing system includes a communication state storage apparatus 97, a data bus 96, a time generation circuit 98 and a digital signal processing circuit 99. The information signal generator 1, cyclic code generation circuit array 12, synchronization code generation circuit 7, switch 16, cosine rotation frequency generation circuit 4, sine rotation frequency generation circuit 14, multipliers 3, 5, 13 and 15, delay devices 85 and 95, communication state storage apparatus 97, data bus 96, time generation circuit 98 and digital signal processing circuit 99 configure a digital rotational polarization wave transmission and reception module 107.

Also the rotational polarization wireless device 408 paired with the rotational polarization wireless device 308 has a configuration similar to that of the rotational polarization wireless device 308. In particular, the rotational polarization wireless device 408 generally includes a transmission system (transmission unit), a reception system (reception unit) and a signal processing system. The transmission system is configured from an information signal generator 51, a cyclic code generation circuit array 62, a synchronization code generation circuit 57, a switch 66, a cosine rotation frequency generation circuit 54, a sine rotation frequency generation circuit 64, a carrier frequency generation circuit 61, power amplifiers 59 and 69, transmission antennae 60 and 70, and multipliers 53, 55, 58, 63, 65 and 68. The reception system is configured from reception antennae 30 and 40, low noise amplifiers 31 and 41, a local oscillation circuit 39, multipliers 32 and 42, band-pass filters 33 and 43, buffer amplifiers 34 and 44 and delay devices 35 and 45. The signal processing system includes a communication state storage apparatus 47, a data bus 46, a time generation circuit 48 and a digital signal processing circuit 49. The information signal generator 51, cyclic code generation circuit array 62, synchronization code generation circuit 57, switch 66, cosine rotation frequency generation circuit 54, sine rotation frequency generation circuit 64, multipliers 53, 55, 63 and 65, delay devices 35 and 45, communication state storage apparatus 47, data bus 46, time generation circuit 48 and digital signal processing circuit 49 configure a digital rotational polarization wave transmission and reception module 107a.

In the paired rotational polarization wireless devices 308 and 408, the communication state storage apparatus 47 and 97 are coupled to the digital signal processing circuits 49 and 99, respectively, and store information of polarization angle differences of transmitted polarization waves and received polarization waves between the paired rotational polarization wireless devices 308 and 408 in a time series and then transmit the information to the outside using the data buses 46 and 96, respectively.

The configuration of the other part of the wireless communication system is similar to that in the seventh embodiment.

Also with the present embodiment configured in such a manner as described above, similar advantageous effects to those of the seventh embodiment can be achieved.

Further, by checking the variation of the angle difference between polarization waves in a time series, an environmental variation which has an influence on radio wave propagation around the wireless communication system. Therefore, the timing for maintenance for allowing the wireless communication system to operate stably can be detected. Therefore, stabilization of the wireless communication system can be anticipated, and the time required for system restoration when an eventuality occurs can be reduced.

Ninth Embodiment

A ninth embodiment of the present invention is described in detail with reference to FIG. 9.

The present embodiment is configured such that the transmission antenna and the reception antenna in the first embodiment are used commonly for transmission and reception using a circulator.

Figure 9:
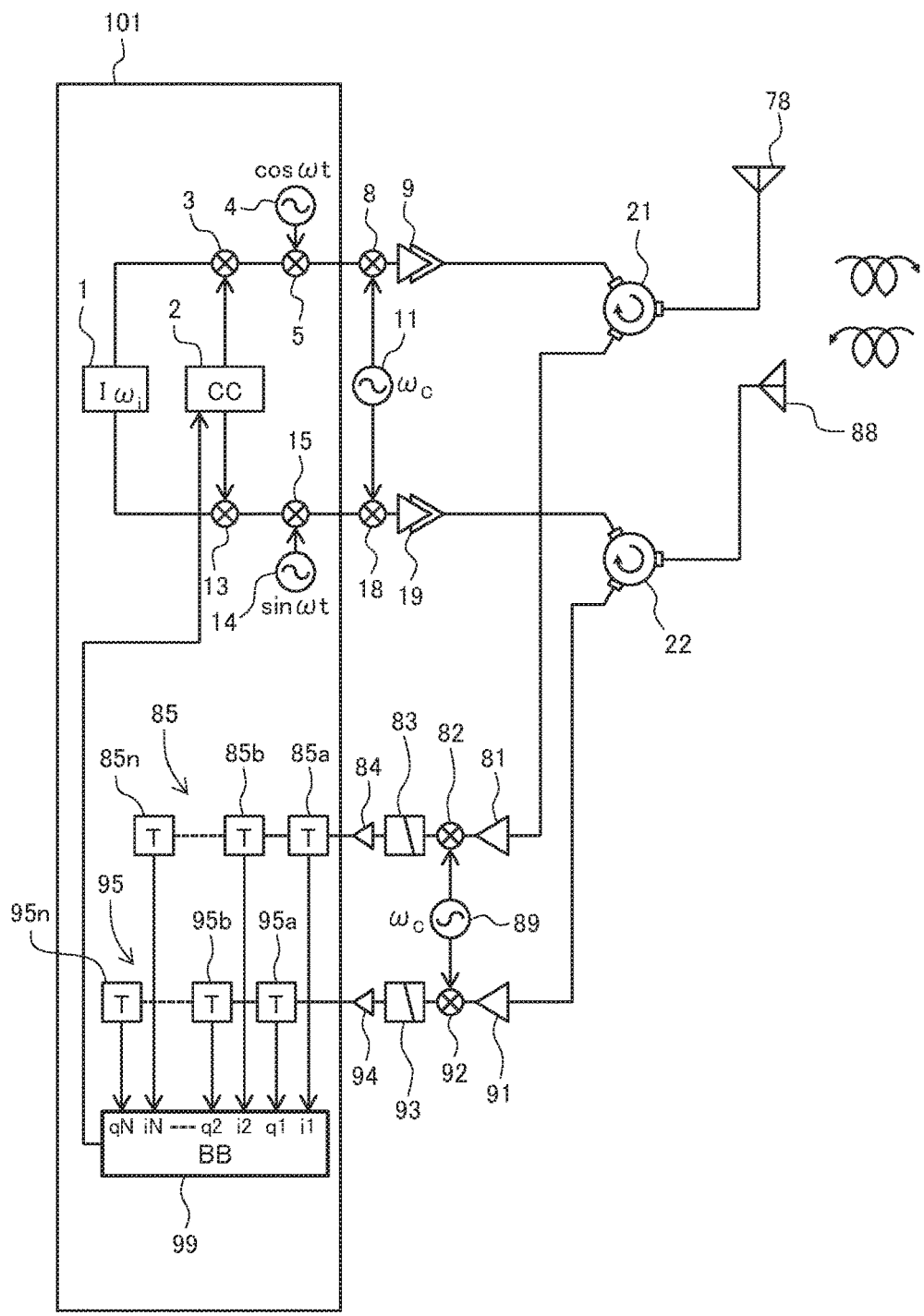
FIG. 9 is a block diagram schematically depicting a wireless communication system according to a ninth embodiment.

FIG. 9 is a view schematically depicting a wireless communication system according to the present embodiment. In FIG. 9, like elements to those in the seventh embodiment are denoted by like reference characters, and overlapping description of them is omitted herein.

FIG. 9 exemplifies a rotational polarization wireless device 309 extracted from a pair of wireless devices which configure the wireless communication system for simplified illustration.

Referring to FIG. 9, the rotational polarization wireless device 309 generally includes a transmission system (transmission unit), a reception system (reception unit) and a signal processing system. The transmission system is configured from an information signal generator 1, a cyclic code generation circuit 2, a cosine rotation frequency generation circuit 4, a sine rotation frequency generation circuit 14, a carrier frequency generation circuit 11, power amplifiers 9 and 19, duplexer antennae 78 and 88, circulators 21 and 22 and multipliers 3, 5, 8, 13, 15 and 18. The reception system is configured from the duplexer antennae 78 and 88 (shared by the transmission unit), the circulators 21 and 22 (shared by the transmission unit), low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99. The information signal generator 1, cyclic code generation circuit 2, cosine rotation frequency generation circuit 4, sine rotation frequency generation circuit 14, multipliers 3, 5, 13 and 15, delay devices 85 and 95 and digital signal processing circuit 99 configure a digital rotational polarization wave transmission and reception module 101.

Also the rotational polarization wireless device paired with the rotational polarization wireless device 309 has a configuration similar to that of the rotational polarization wireless device 309. It is to be noted that the rotational polarization wireless device paired with the rotational polarization wireless device 309 may be configured similarly to the rotational polarization wireless device 401 in the first embodiment.

In the rotational polarization wireless device 309, an output of the cyclic code generation circuit 2 is superimposed by the multiplier 3 to one of two outputs branched from the information signal generator 1 and is then multiplied by an output of the cosine rotation frequency generation circuit 4 by the multiplier 5, whereafter it is multiplied by an output of the carrier frequency generation circuit 11 by the multiplier 8 and then inputted to a first terminal of the circulator 21 through the power amplifier 9. Further, in the rotational polarization wireless device 309, an output of the cyclic code generation circuit 2 is superimposed by the multiplier 13 to the other one of the two outputs branched from the information signal generator 1 and is multiplied by an output of the sine rotation frequency generation circuit 14 by the multiplier 15, whereafter is it multiplied by an output of the carrier frequency generation circuit 11 by the multiplier 18 and then is inputted to a first terminal of the circulator 22 through the power amplifier 19.

In the rotational polarization wireless device 309, an output from a third terminal of the circulator 21 is amplified by the low noise amplifier 81 and then multiplied by an output of the local oscillation circuit 89, which generates a signal of a frequency equal to the carrier frequency, by the multiplier 82. Then, an output of the multiplier 82 is inputted to the buffer amplifier 84 through the band-pass filter 83, and an output of the buffer amplifier 84 is successively delayed by the delay device 85 and then inputted to the digital signal processing circuit 99. Further, in the rotational polarization wireless device 309, an output of a third terminal of the circulator 22 is amplified by the low noise amplifier 91 and is then multiplied by an output of the local oscillation circuit 89, which generates a signal of a frequency equal to the carrier frequency, by the multiplier 92. Then, an output of the multiplier 92 is inputted to the buffer amplifier 94 through the band-pass filter 93, and an output of the buffer amplifier 94 is successively delayed by the delay device 95 and then inputted to the digital signal processing circuit 99.

Second terminals of the circulators 21 and 22 are coupled to the duplexer antennae 78 and 88, respectively. Since the circulators 21 and 22 transmit a signal in a circulation order of terminals thereof, the duplexer antennae 78 and 88 radiate outputs of the power amplifiers 9 and 19 into the space, and power of an electromagnetic wave arriving at the rotational polarization wireless device 309 is inputted to the low noise amplifiers 81 and 91.

The configuration of the other part of the wireless communication system is similar to that in the first embodiment.

Also with the present embodiment configured in such a manner as described above, similar advantageous effects to those of the first embodiment can be achieved.

Further, since an antenna can be used commonly for transmission and reception, the size of the rotational polarization wireless devices which configure the wireless communication system can be reduced, and the fabrication cost for the rotational polarization wireless devices can be reduced.

Tenth Embodiment

A tenth embodiment of the present invention is described in detail with reference to FIG. 10.

In the present embodiment, an antenna switch is used in place of the circulator in the ninth embodiment.

Figure 10:
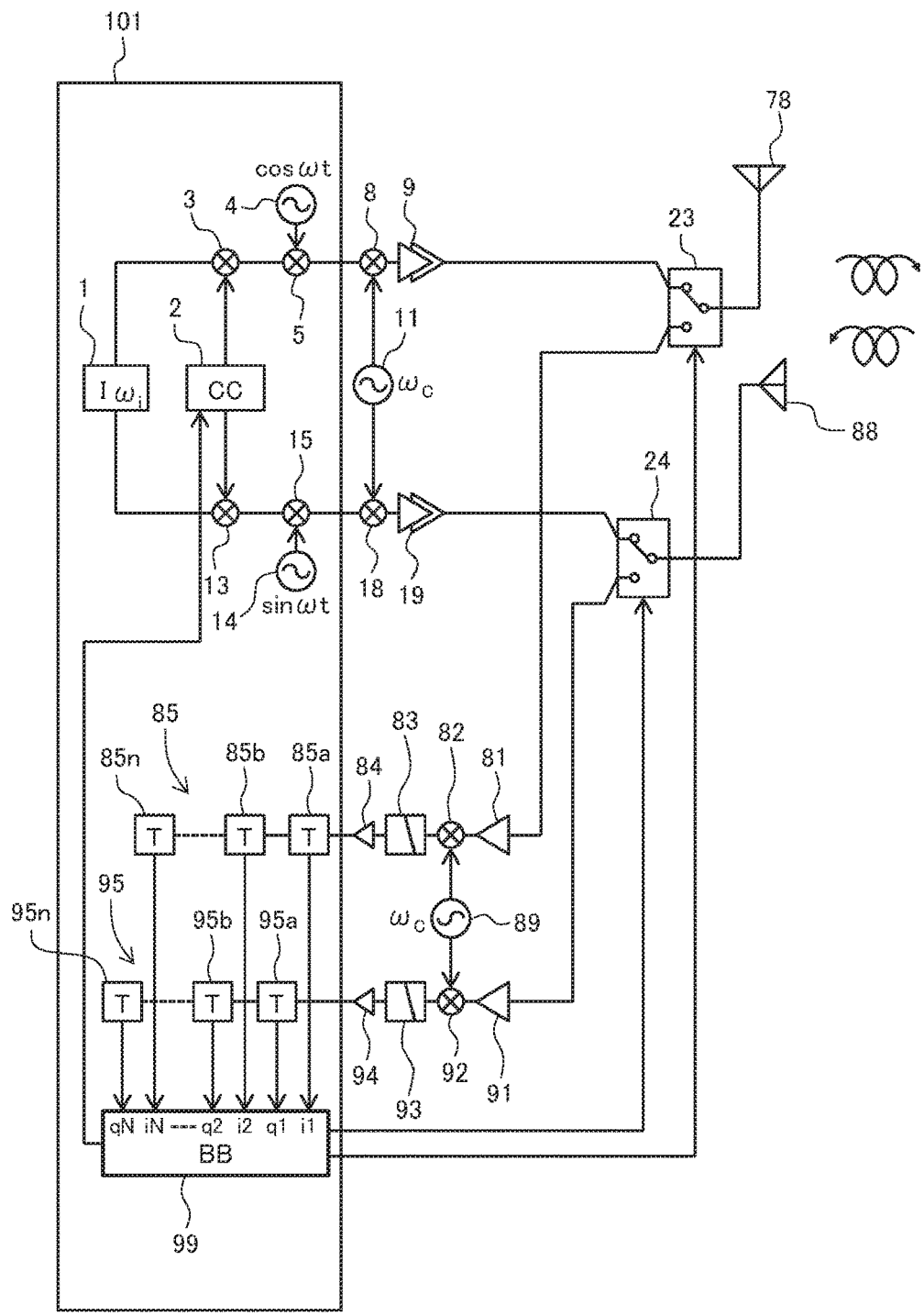
FIG. 10 is a block diagram schematically depicting a wireless communication system according to a tenth embodiment.

FIG. 10 is a view schematically depicting a wireless communication system according to the present embodiment. In FIG. 10, like elements to those in the ninth embodiment are denoted by like reference characters, and overlapping description of them is omitted herein.

FIG. 10 exemplifies a rotational polarization wireless device 310 extracted from a pair of wireless devices which configure the wireless communication system for simplified illustration.

Referring to FIG. 10, the rotational polarization wireless device 310 generally includes a transmission system (transmission unit), a reception system (reception unit) and a signal processing system. The transmission system is configured from an information signal generator 1, a cyclic code generation circuit 2, a cosine rotation frequency generation circuit 4, a sine rotation frequency generation circuit 14, a carrier frequency generation circuit 11, power amplifiers 9 and 19, duplexer antennae 78 and 88, antenna switches 23 and 24 and multipliers 3, 5, 8, 13, 15 and 18. The reception system is configured from the duplexer antennae 78 and 88 (shared by the transmission unit), the antenna switches 23 and 24 (shared by the transmission unit), low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99. The information signal generator 1, cyclic code generation circuit 2, cosine rotation frequency generation circuit 4, sine rotation frequency generation circuit 14, multipliers 3, 5, 13 and 15, delay devices 85 and 95 and digital signal processing circuit 99 configure a digital rotational polarization wave transmission and reception module 101.

In the rotational polarization wireless device 310, an input terminal and an output terminal of the antenna switch 23 are coupled to an output of the power amplifier 9 and an input of the low noise amplifier 81, respectively, and a common terminal of the antenna switch 23 is coupled to the duplexer antenna 78. Meanwhile, an input terminal and an output terminal of the antenna switch 24 are coupled to an output of the power amplifier 19 and an input of the low noise amplifier 91, respectively, and a common terminal of the antenna switch 24 is coupled to the duplexer antenna 88. The antenna switches 23 and 24 are controlled by the digital signal processing circuit 99 and perform transmission and reception time-divisionally.

The configuration of the other part of the wireless communication system is similar to that in the ninth embodiment.

Also with the present embodiment configured in such a manner as described above, similar advantageous effects to those of the ninth embodiment can be achieved.

Further, since the present embodiment does not use a circulator which is comparatively great in size and heavy, the rotational polarization wireless devices which configure the wireless communication system can be reduced in dimension and weight, and the fabrication cost of the rotational polarization wireless devices can be reduced.

Eleventh Embodiment

An eleventh embodiment of the present invention is described in detail with reference to FIG. 11.

In the present embodiment, the transmission unit is changed in configuration from the ninth embodiment.

Figure 11:
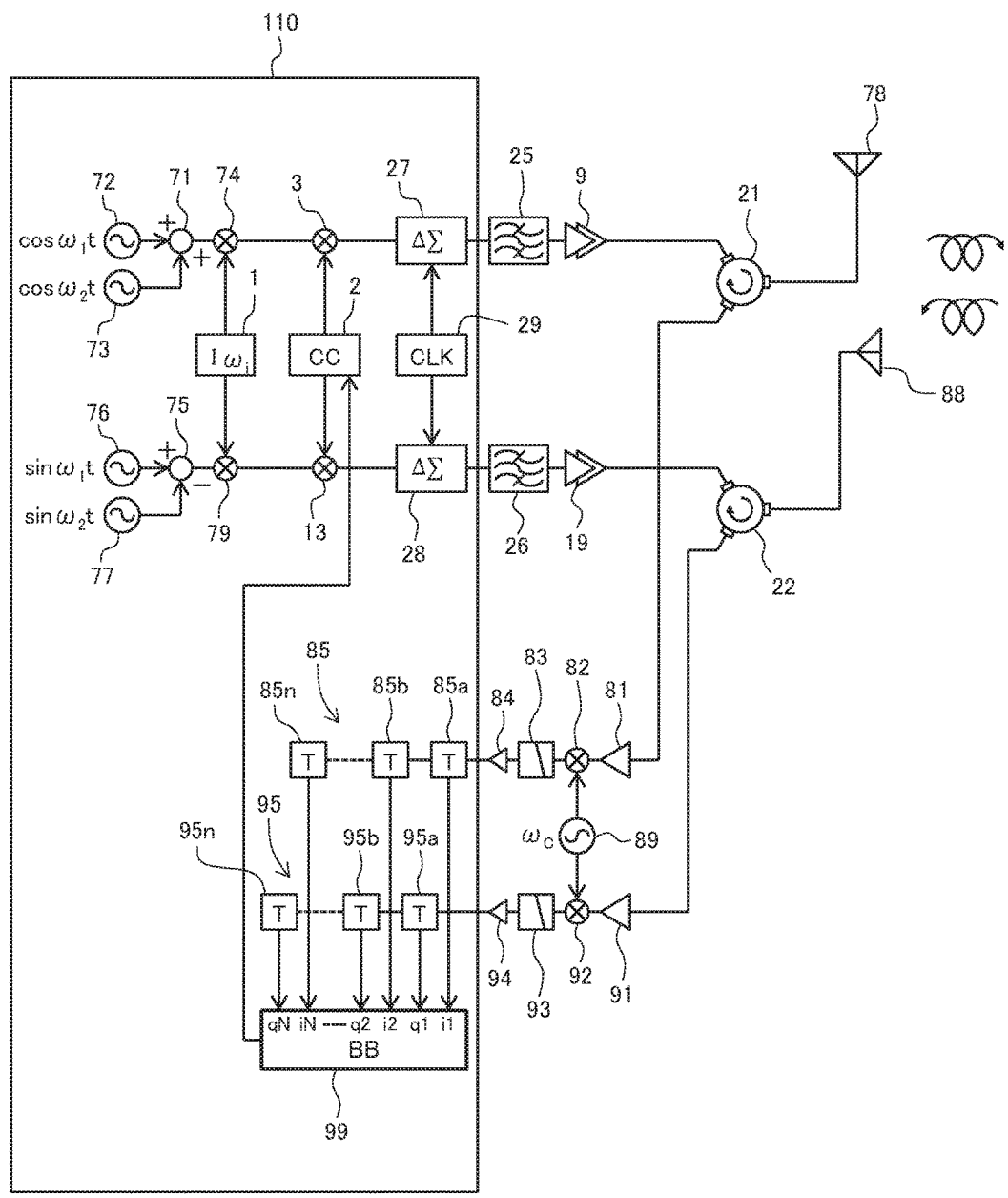
FIG. 11 is a block diagram schematically depicting a wireless communication system according to an eleventh embodiment.

FIG. 11 is a view schematically depicting a wireless communication system according to the present embodiment. In FIG. 11, like elements to those in the ninth embodiment are denoted by like reference characters, and overlapping description of them is omitted herein.

FIG. 11 exemplifies a rotational polarization wireless device 311 extracted from a pair of wireless devices which configure the wireless communication system for simplified illustration.

Referring to FIG. 11, the rotational polarization wireless device 311 generally includes a transmission system (transmission unit), a reception system (reception unit) and a signal processing system. The transmission system is configured from cosine wave carrier generation circuits 72 and 73, sine wave carrier generation circuits 76 and 77, an information signal generator 1, a cyclic code generation circuit 2, a clock generation circuit 29, delta sigma circuits 27 and 28, band-pass filters 25 and 26, power amplifiers 9 and 19, duplexer antennae 78 and 88, circulators 21 and 22, an adder 71, a subtractor 75 and multipliers 3, 13, 74 and 79. The reception system is configured from the duplexer antennae 78 and 88 (shared by the transmission unit), the circulators 21 and 22 (shared by the transmission unit), low noise amplifiers 81 and 91, a local oscillation circuit 89, multipliers 82 and 92, band-pass filters 83 and 93, buffer amplifiers 84 and 94 and delay devices 85 and 95. The signal processing system includes a digital signal processing circuit 99. The cosine wave carrier generation circuits 72 and 73, sine wave carrier generation circuits 76 and 77, information signal generator 1, cyclic code generation circuit 2, clock generation circuit 29, delta sigma circuits 27 and 28, multipliers 3, 13, 74 and 79, delay devices 85 and 95 and digital signal processing circuit 99 configure a digital rotational polarization wave transmission and reception module 110.

In the rotational polarization wireless device 311, a beat-state carrier formed by adding outputs of the cosine wave carrier generation circuits 72 and 73 by the adder 71 is multiplied by the multiplier 74 by one of the two outputs branched from the information signal generator 1 and is superimposed to an output of the cyclic code generation circuit 2 by the multiplier 3, whereafter it is multiplied by the delta sigma circuit 27, passes through the band-pass filter 25, amplified by the power amplifier 9, and then inputted to a first terminal of the circulator 21. Meanwhile, a beat-state carrier formed by calculating a difference between outputs of the sine wave carrier generation circuits 76 and 77 by the subtractor 75 is multiplied by the other one of the two branch outputs of the information signal generator 1 by the multiplier 79 and then is superimposed to an output of the cyclic code generation circuit 2 by the multiplier 13, whereafter it is multiplied by the delta sigma circuit 28, passed through the band-pass filter 26, amplified by the power amplifier 19 and inputted to a first terminal of the circulator 22.

In the rotational polarization wireless device 311, an output of a third terminal of the circulator 21 is amplified by the low noise amplifier 81 and multiplied by the multiplier 82 by an output of the local oscillation circuit 89, which generates a signal of a frequency equal to the carrier frequency, and an output of the multiplier 82 is inputted to the buffer amplifier 84 through the band-pass filter 83. Then, an output of the buffer amplifier 84 is successively delayed by the delay device 85 and inputted to the digital signal processing circuit 99. Meanwhile, an output of a third terminal of the circulator 22 is amplified by the low noise amplifier 91 and is multiplied by the multiplier 92 by an output of the local oscillation circuit 89, which generates a signal of a frequency equal to the carrier frequency, and an output of the multiplier 92 is inputted to the buffer amplifier 94 through the band-pass filter 93. Then, an output of the buffer amplifier 94 is successively delayed by the delay device 95 and inputted to the digital signal processing circuit 99.

Second terminals of the circulators 21 and 22 are coupled to the duplexer antennae 78 and 88, respectively. To the delta sigma circuits 27 and 28, an operation clock is supplied from the clock generation circuit 29. Since the circulators 21 and 22 transmit a signal in an order of circulation of their terminals, the duplexer antennae 78 and 88 radiate outputs of the power amplifiers 9 and 19 into the space and power of electromagnetic waves arriving at the rotational polarization wireless device 309 is inputted to the low noise amplifiers 81 and 91.

The configuration of the other part of the wireless communication system is similar to that in the ninth embodiment.

Also with the present embodiment configured in such a manner as described above, similar advantageous effects to those of the ninth embodiment can be achieved.

Further, since generation of an input signal to the power amplifiers and processing of output signals of the low noise amplifiers can be implemented all by digital circuits, the size of the rotational polarization wireless devices which configure the wireless communication system can be reduced, and the fabrication cost for the rotational polarization wireless devices can be reduced. Further, an elongated life of the rotational polarization wireless devices can be implemented.

Twelfth Embodiment

A twelfth embodiment of the present invention is described in detail with reference to FIG. 12.

In the present embodiment, the wireless communication systems described in connection with the first to eleventh embodiments are applied to an elevator controlling system.

Figure 12:
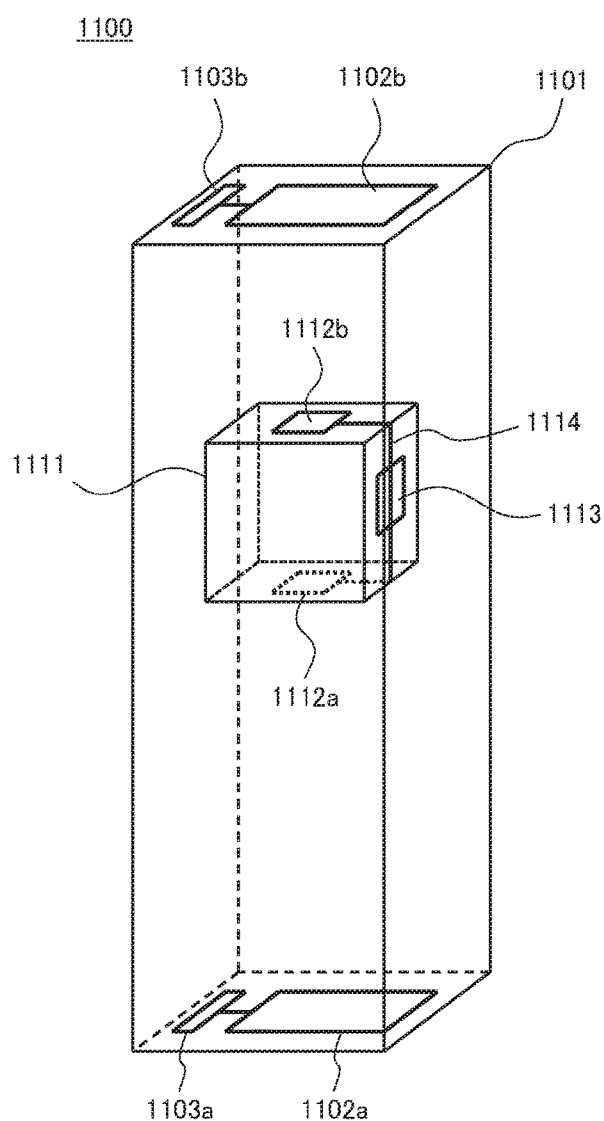
FIG. 12 is a block diagram schematically depicting a wireless communication system according to a twelfth embodiment.

FIG. 12 is a view schematically depicting an elevator controlling system to which the wireless communication system according to the present embodiment is applied.

Referring to FIG. 12, the elevator system 1100 moves an elevator cab 1111 in the inside of a building 1101. A base station wireless device 1103 (1103a, 1103b) and an orthogonal polarization integrated antenna 1102 (1102a, 1102b) coupled to each other are provided on each of the floor and the ceiling of the inside of the building 1101. The base station wireless device 1103 includes a transmitter and a receiver of the wireless communication system for detecting a propagation path modification act of an outsider and compensating for degradation of communication quality between transmission and reception against the modification. An orthogonal polarization integrated antenna 1112 (1112a, 1112b) is provided on each of the outer side of the floor and the outer side of the ceiling of the elevator cab 1111. The orthogonal polarization integrated antenna 1112 is coupled to a terminal station wireless device 1113, which includes a transmitter and a receiver of the wireless communication system which detects a propagation path modification act and compensates for degradation of the communication quality between transmission and reception against the modification, using a high frequency cable 1114. The base station wireless device 1103 and the terminal station wireless device 1113 use the inside of the building 1101 as a wireless transmission medium, and therefore, electronic waves undergo multiple reflection by inner walls of the building 1101 and outer walls of the elevator cab 1111. Therefore, a multiple-wave interface environment is formed.

In the present embodiment, a propagation path modification act from an outsider is detected under a multiple-wave interference environment, and wireless transmission of high quality which compensates for degradation of the communication quality between transmission and reception against the modification can be implemented. Therefore, control and supervision of the elevator cab 1111 can be carried out remotely without using wire connection means from the building 1101, and wire connection means such as a cable can be omitted. Further, the same transport capacity can be implemented by a smaller building volume. Or, improvement in transport capacity by increasing the size of an elevator by a same building volume can be implemented.

Thirteenth Embodiment

A thirteenth embodiment of the present invention is described in detail with reference to FIG. 13.

In the present embodiment, the wireless communication systems described in connection with the first to eleventh embodiments are applied to an elevator controlling system.

Figure 13:
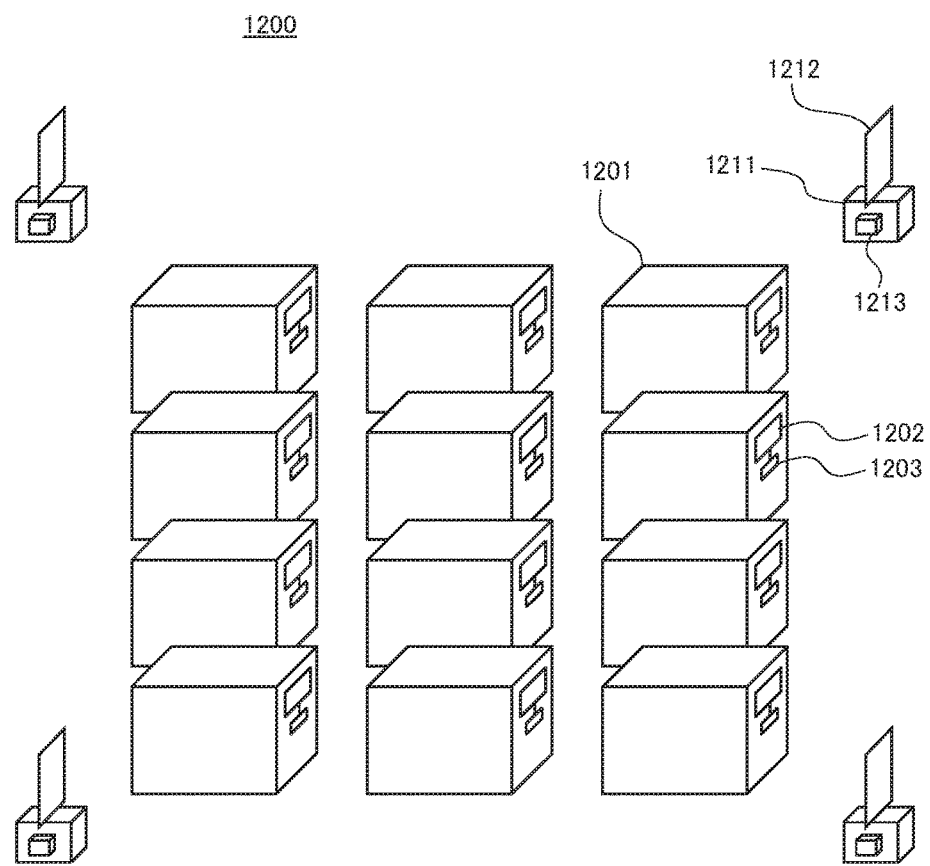
FIG. 13 is a block diagram schematically depicting a wireless communication system according to a thirteenth embodiment.

FIG. 13 is a view schematically depicting a transformer substation controlling system to which the wireless communication system according to the present embodiment is applied.

Referring to FIG. 13, the substation equipment monitoring system 1200 includes a plurality of substation machines 1201, in each of which a terminal station wireless device 1203 and a terminal station rotational polarization antenna 1202 as a rotational polarization wireless device configuring a wireless communication system of the present invention are provided in a coupled state to each other. A plural number of local station apparatus 1211 smaller than the number of substation machines 1201 are provided in the proximity of the substation machines 1201. In each of the local station apparatus 1211, a base station wireless device 1213 and a base station rotational polarization antenna 1212 as a rotational polarization wireless device configuring a wireless communication system of the present invention are provided in a coupled state to each other are provided in a coupled state to each other.

The substation machines 1201 have a size of an order of several meters. Since the size is overwhelmingly great in comparison with a wavelength of several hundred MHz to several GHz which corresponds to a frequency of electromagnetic waves used by the rotational polarization wireless devices, the electromagnetic waves are subject to multiple reflections by the plural substation machines 1201, whereby a multiple wave interference environment is formed.

In the present embodiment, wireless transmission of high quality which compensates for degradation of the communication quality between transmission and reception can be implemented using a plurality of reflection waves under a multiple reflection interference environment. Therefore, control and supervision of the substation machines 1201 can be carried out remotely by a plurality of local station apparatus 1211 without using wire coupling means. Further, by solving the problem of high voltage inductive power which is a problem where wire coupling means such as a cable is used, the cost required to lay cables can be deleted. Therefore, improvement in safety and reduction of the cost of the control and supervision system for the substation machines 1201 can be anticipated.

It is to be noted that the present invention is not limited to the embodiments described above but can be carried out in various modified forms. For example, the embodiments have been described in detail in order to facilitate understandings of the present invention and the invention is not necessarily limited to embodiments which include all of the components described hereinabove.

DESCRIPTION OF REFERENCE CHARACTERS

1: Information signal generator
2: Cyclic code generation circuit
3, 5, 8, 13, 15, 18: Multipliers
4: Cosine rotation frequency generation circuit
6, 16: Switches
7: Synchronization code generation circuit
9, 19: Power amplifiers
10, 20: Transmission antennae
11: Carrier frequency generation circuit
12: Cyclic code generation circuit array
14: Sine rotation frequency generation circuit
21, 22: Circulators
23, 24: Antenna switches
25, 26: Band-pass filters
27, 28: Delta sigma circuits
29: Clock generation circuit
30, 40: Reception antennae
31, 41: Low noise amplifiers
32, 42: Multipliers
33, 43: Band-pass filters
34, 44: Buffer amplifiers
35, 35a, 35b, 35n: Delay devices
39: Local oscillation circuit
45, 45a, 45b, 45n: Delay devices
46: Data bus
47: Communication state storage apparatus
48: Time generation circuit
49: Digital signal processing circuit
51: Information signal generator
52: Cyclic code generation circuit
53, 55, 58, 63, 65, 68: Multipliers
54: Cosine rotation frequency generation circuit
56, 66: Switches
57: Synchronization code generation circuit
59, 69: Amplifiers
60, 70: Transmission antennae
61: Carrier frequency generation circuit
62: Cyclic code generation circuit array
64: Sine rotation frequency generation circuit
71: Adder
72, 73: Cosine wave carrier generation circuits
74, 79: Multipliers
75: Subtractor
76, 77: Sine wave carrier generation circuits
78, 88: Duplexer antennae
80, 90: Reception antennae
81, 91: Low noise amplifiers
82, 92: Multipliers
83, 93: Band-pass filters
84, 94: Buffer amplifiers
85, 85a, 85b, 85n: Delay devices
89: Local oscillation circuit
95, 95a, 95b, 95n: Delay devices
96: Data bus
97: Communication state storage apparatus
98: Time generation circuit
99: Digital signal processing circuit
101-107: Digital rotational polarization wave transmission and reception modules
101a-107a: Digital rotational polarization wave transmission and reception modules
110, 201: Digital rotational polarization wave transmission and reception modules
301-311: Rotational polarization wireless devices
401-408: Rotational polarization wireless devices
1100: Elevator system
1101: Building
1102: Orthogonal polarization integrated antenna
1103: Base station wireless device
1111: Elevator cab
1112: Orthogonal polarization integrated antenna
1113: Terminal station wireless device
1114: High frequency cable
1200: Substation equipment monitoring system
1201: Substation machine
1202: Terminal station rotational polarization antenna
1203: Terminal station wireless device
1211: Local station apparatus
1212: Base station rotational polarization antenna
1213: Base station wireless device

What is claimed is:

1. A wireless communication system, comprising:
a plurality of wireless devices configured to communicate with each other;
each of the wireless devices including:
a transmission unit configured to transmit a carrier of a fixed strength with polarization waves thereof rotated to a different one of the wireless devices using two antennae spatially orthogonal to each other;
a reception unit configured to receive a carrier transmitted from the transmission unit of the different wireless device; and
a timing detection unit configured to detect a timing at which the polarization waves of the carrier received by the reception unit within a period of rotation indicates a maximum strength;
the transmission unit performing transmission or reception of a specific information signal using the carrier based on the timing detected by the timing detection unit.

2. The wireless communication system according to claim 1, wherein
the transmission units of the plurality of wireless devices have a common cyclic code and superimpose the cyclic code to the information signal using the timing detected by the timing detection unit as a reference point.

3. The wireless communication system according to claim 1, wherein
the transmission units of the plurality of wireless devices have a plurality of cyclic codes different from each other that are common to those of the other ones of the plurality of wireless devices and performs switching of the plurality of different cyclic codes at a timing based on the timing detected by the timing detection unit so as to superimpose one of the cyclic codes to the information signal.

4. The wireless communication system according to claim 1, wherein
the transmission units of the plurality of wireless devices have a common synchronization code and superimpose the synchronization code to the information signal at a timing different from the timing at which the cyclic code is used such that synchronism of a period of rotation of polarization waves of the carrier is established between the plurality of radio waves.

5. The wireless communication system according to claim 2, wherein each of the wireless devices further includes a timer configured to store the timing detected by the timing detection unit, and the transmission unit superimposes the cyclic code to the information signal at a timing based on the timing stored in the timer and a period of rotation of polarization waves of the carrier.

6. The wireless communication system according to claim 1, wherein each of the wireless devices further includes a log memory configured to store information of the timing detected by the timing detection unit in a time series, and the transmission unit detects a situation variation of a wireless environment surrounding the wireless device based on information of the timing stored in the log memory.

7. The wireless communication system according to claim 1, wherein at least one pair of ones of the plurality of wireless devices are different from each other in direction of rotation of polarization waves of the carrier.

8. The wireless communication system according to claim 1, wherein the transmission unit includes a cosine wave generation circuit and a sine wave generation unit configured to generate a cosine wave and a sine wave of a first frequency, respectively, and another cosine wave generation circuit and another sine wave generation circuit configured to generate a cosine wave and a sine wave of a second frequency different from the first frequency, respectively, and the polarization waves of the carrier are rotated by a frequency equal to one half a difference between the first frequency and the second frequency.

9. An elevator controlling system, comprising:

an elevator cab configured to move up and down in the inside of a building; and the wireless devices of the wireless communication system according to claim 1 each disposed at corresponding one end and the other end of a range of movement of the elevator cab in the inside of the building.

10. A substation controlling system, comprising:

a plurality of substation machines disposed in electric substation equipment;

at least one base station apparatus configured to control the plurality of substation machines, the number of the base station apparatus being smaller than the number of the substation machines; and the wireless devices of the wireless communication system according to claim 1 each disposed at corresponding one of the plurality of substation machines and the base station apparatus.

* * * * *